US012580325B2

(12) United States Patent
Albarede et al.

(10) Patent No.: US 12,580,325 B2
(45) Date of Patent: Mar. 17, 2026

(54) PHASED ARRAY ANTENNAS AND METHODS FOR CONTROLLING UNIFORMITY IN PROCESSING A SUBSTRATE

(71) Applicant: Lam Research Corporation, Fremont, CA (US)

(72) Inventors: Luc Albarede, Fremont, CA (US); John Stephen Drewery, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 56 days.

(21) Appl. No.: 18/703,324

(22) PCT Filed: Oct. 18, 2022

(86) PCT No.: PCT/US2022/047057
§ 371 (c)(1),
(2) Date: Apr. 19, 2024

(87) PCT Pub. No.: WO2023/076078
PCT Pub. Date: May 4, 2023

(65) Prior Publication Data
US 2025/0239784 A1 Jul. 24, 2025

Related U.S. Application Data

(60) Provisional application No. 63/273,680, filed on Oct. 29, 2021.

(51) Int. Cl.
*H01Q 21/00* (2006.01)
*H01Q 3/26* (2006.01)
(Continued)

(52) U.S. Cl.
CPC ....... *H01Q 21/0006* (2013.01); *H01Q 3/2694* (2013.01); *H01Q 3/42* (2013.01); *H05H 1/4645* (2021.05)

(58) Field of Classification Search
CPC .......... H01Q 1/36; H01Q 3/2694; H01Q 3/36; H01Q 3/42; H01Q 21/0006; H05H 1/4645
See application file for complete search history.

(56) References Cited

U.S. PATENT DOCUMENTS 6,514,378 B1 2/2003 Ni et al.
7,450,066 B2 11/2008 Haskell
(Continued)

FOREIGN PATENT DOCUMENTS

EP 3561851 A1 * 10/2019 ............... H05H 1/46

OTHER PUBLICATIONS

ISR & WO PCT/US2022/047057, dated Feb. 7, 2023, 8 pages.
(Continued)

*Primary Examiner* — Daniel Munoz
(74) *Attorney, Agent, or Firm* — Polygon IP, LLP

(57) ABSTRACT

A system for directing a main beam towards a gap within a plasma chamber is provided. The system includes an edge ring and a plurality of antenna elements coupled to the edge ring. The plurality of antenna elements includes a first antenna element and a second antenna element. The first antenna element receives a radio frequency (RF) signal having a phase and the second antenna element receives a phase-shifted signal. The phase-shifted signal has a phase that is shifted with respect to the phase of the RF signal to output the main beam towards the gap within the plasma chamber.

20 Claims, 23 Drawing Sheets

(CCP)

(51) Int. Cl.
*H01Q 3/42* (2006.01)
*H05H 1/46* (2006.01)

(56) References Cited

U.S. PATENT DOCUMENTS

| | | | | |
|---|---|---|---|---|
| 2006/0284783 | A1 | 12/2006 | Mohamadi | |
| 2013/0118687 | A1 | 5/2013 | Todorow et al. | |
| 2018/0241122 | A1* | 8/2018 | Jalali Mazlouman | ... H01Q 3/34 |
| 2021/0203280 | A1 | 7/2021 | Naraine et al. | |

OTHER PUBLICATIONS

WWW. Microwaves 101 “Phased Array Antennas”, 11 pages.
WWW. Microwaves & RF Antenna Patterns Part 1—Linear Array Beam Characteristics And Array Factor, 28 pages.
Wikipedia.Org, “Active Electronically Scanned Array”, 18 pages.
Wikipedia.Org, “Phased Array”, 17 pages.

* cited by examiner (Beam Formation System)

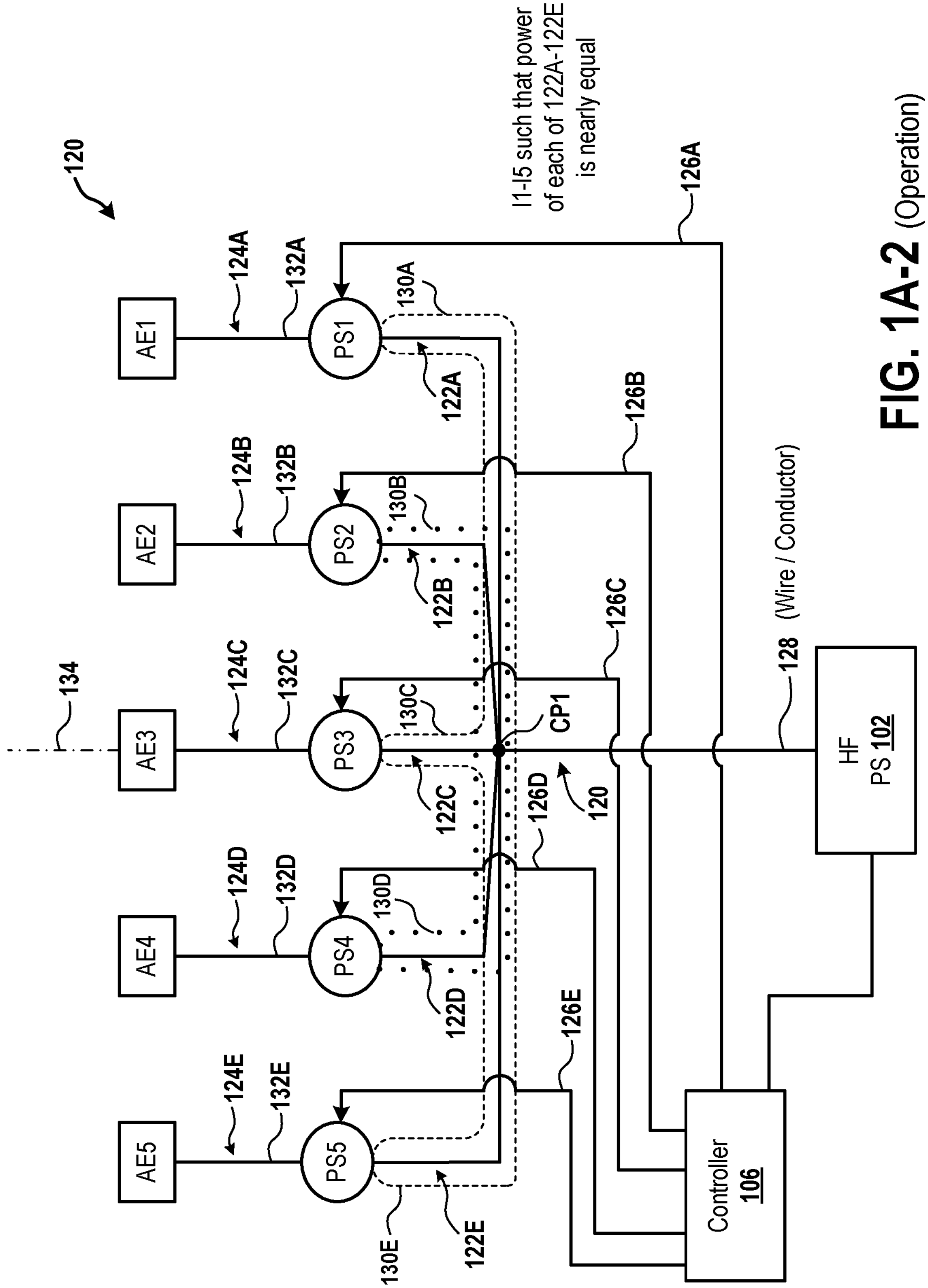
FIG. 1A-2 (Operation)

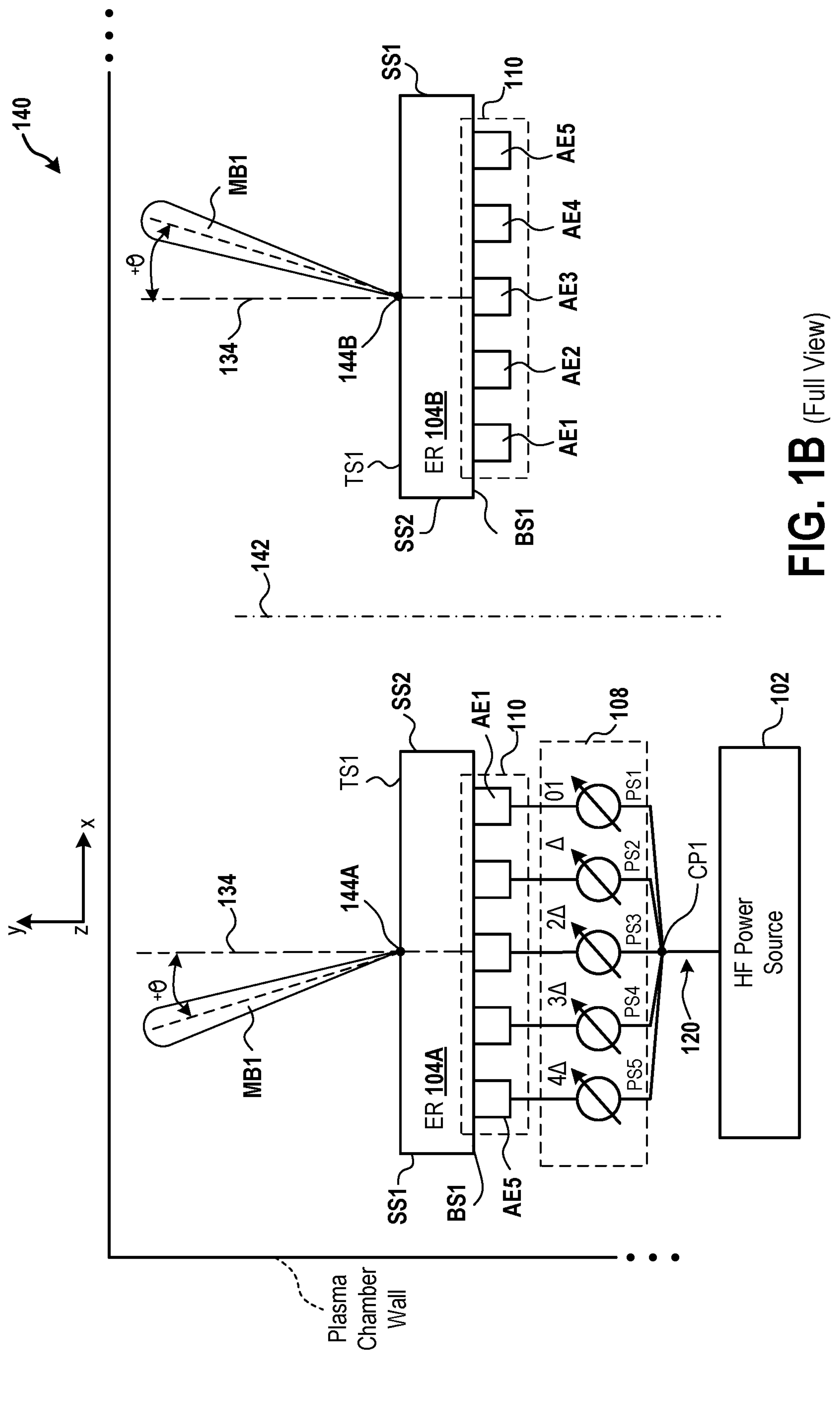
FIG. 1B (Full View)

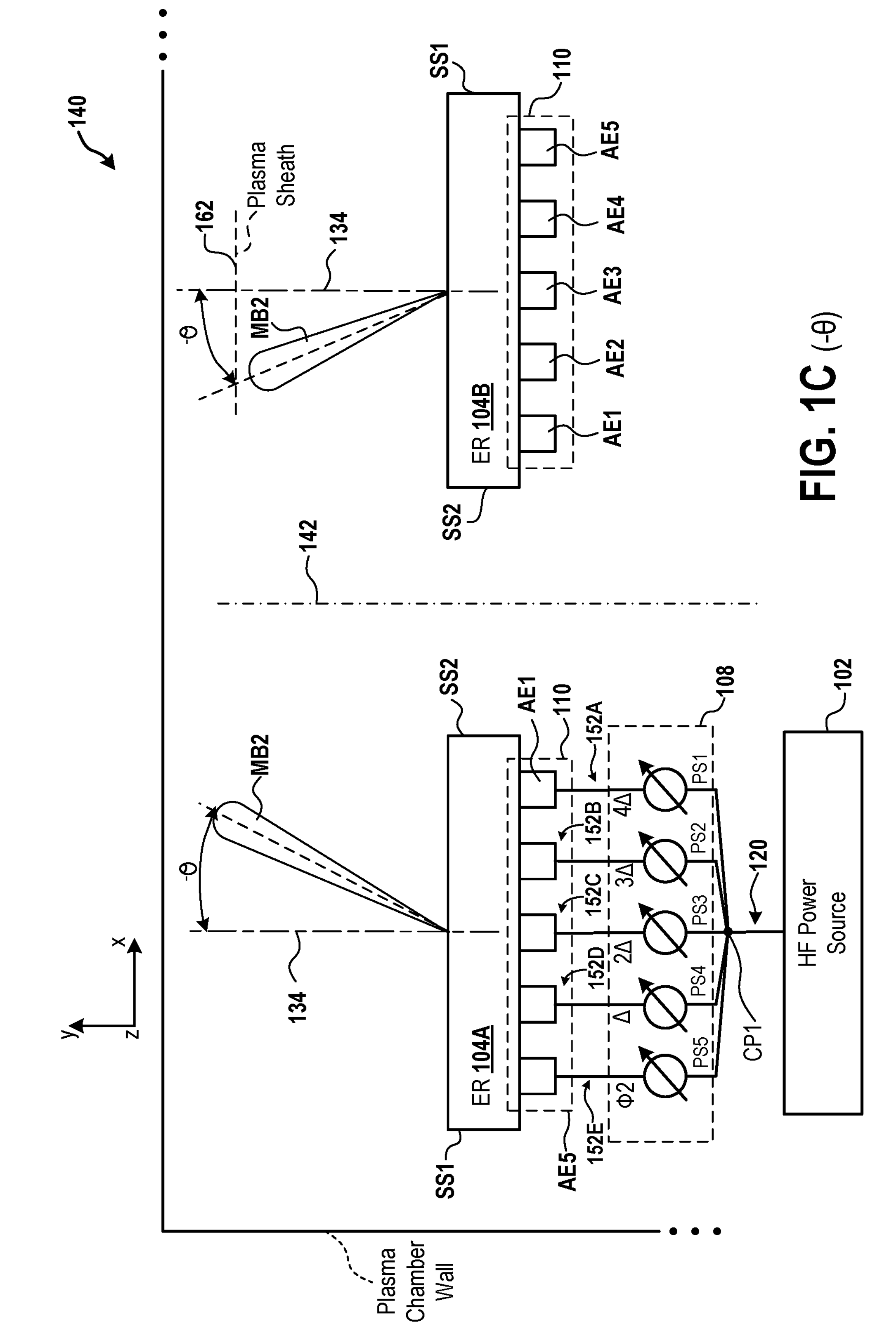
FIG. 1C (-θ)

(Attenuator)

(Operation)

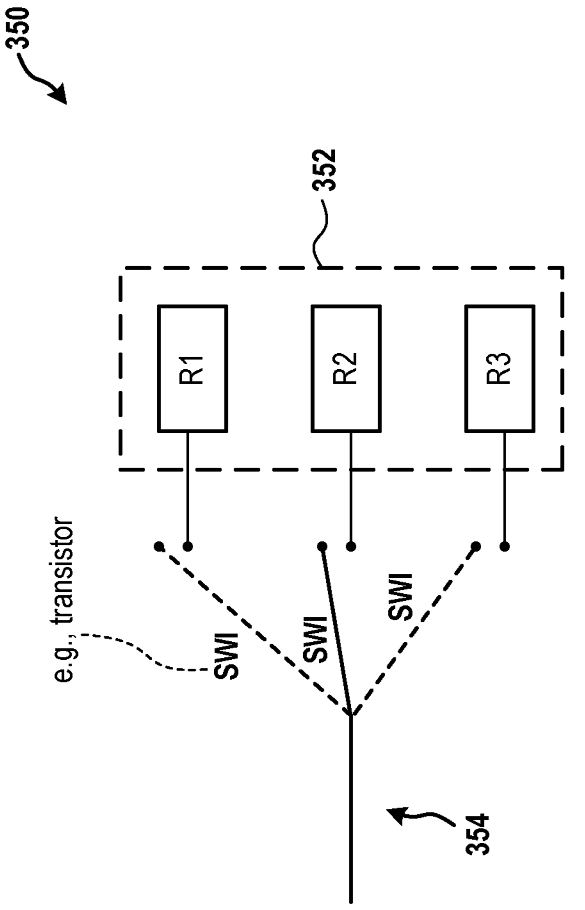
FIG. 3B (Digital Attenuator Element)

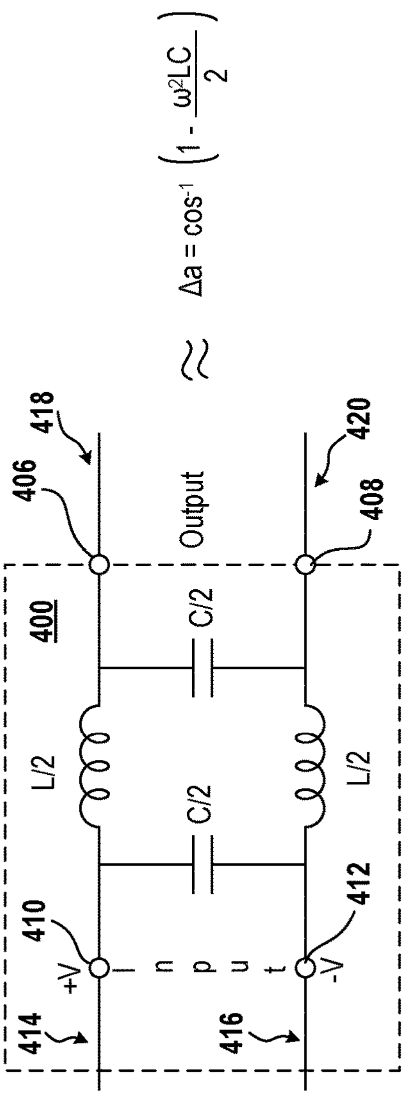
FIG. 4A (Phase Shift Element)
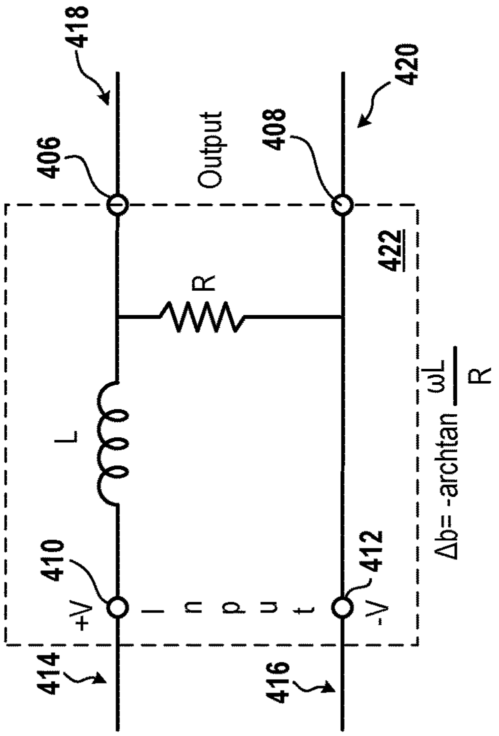
FIG. 4B (Phase Shift Element)
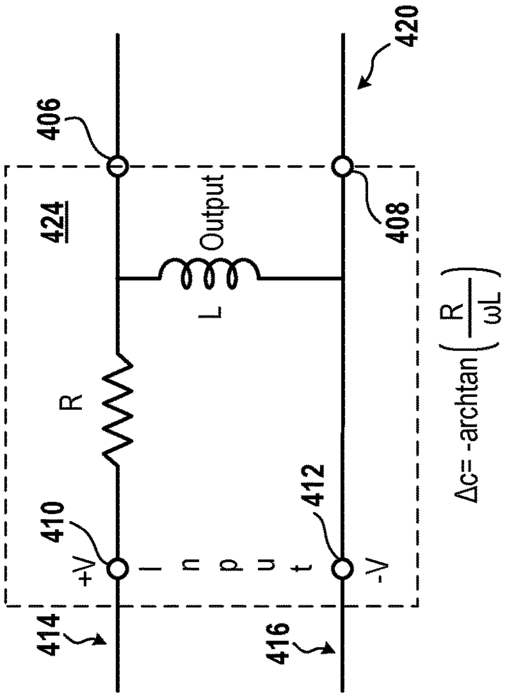
FIG. 4C (Phase Shift Element)

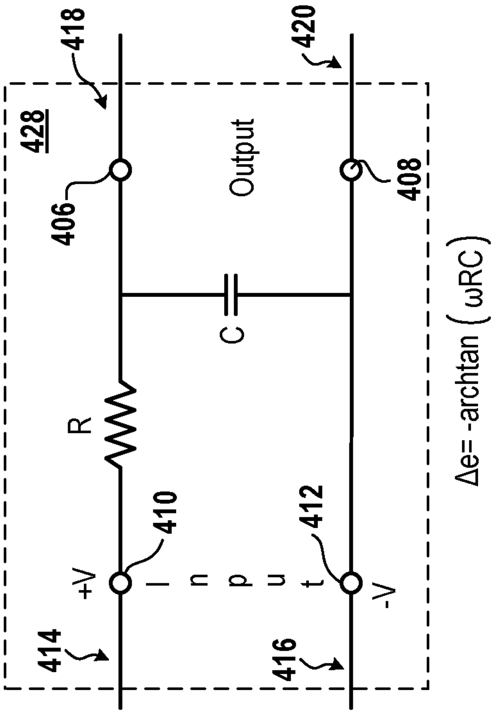
FIG. 4E (Phase Shift Element)
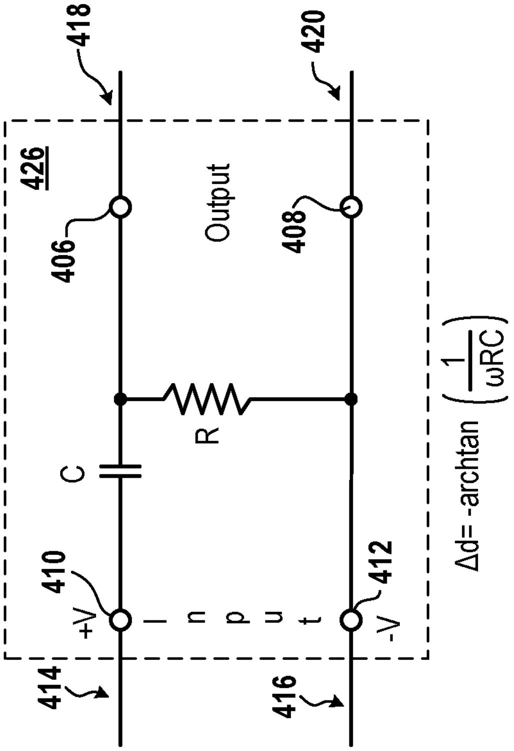
FIG. 4D (Phase Shift Element)

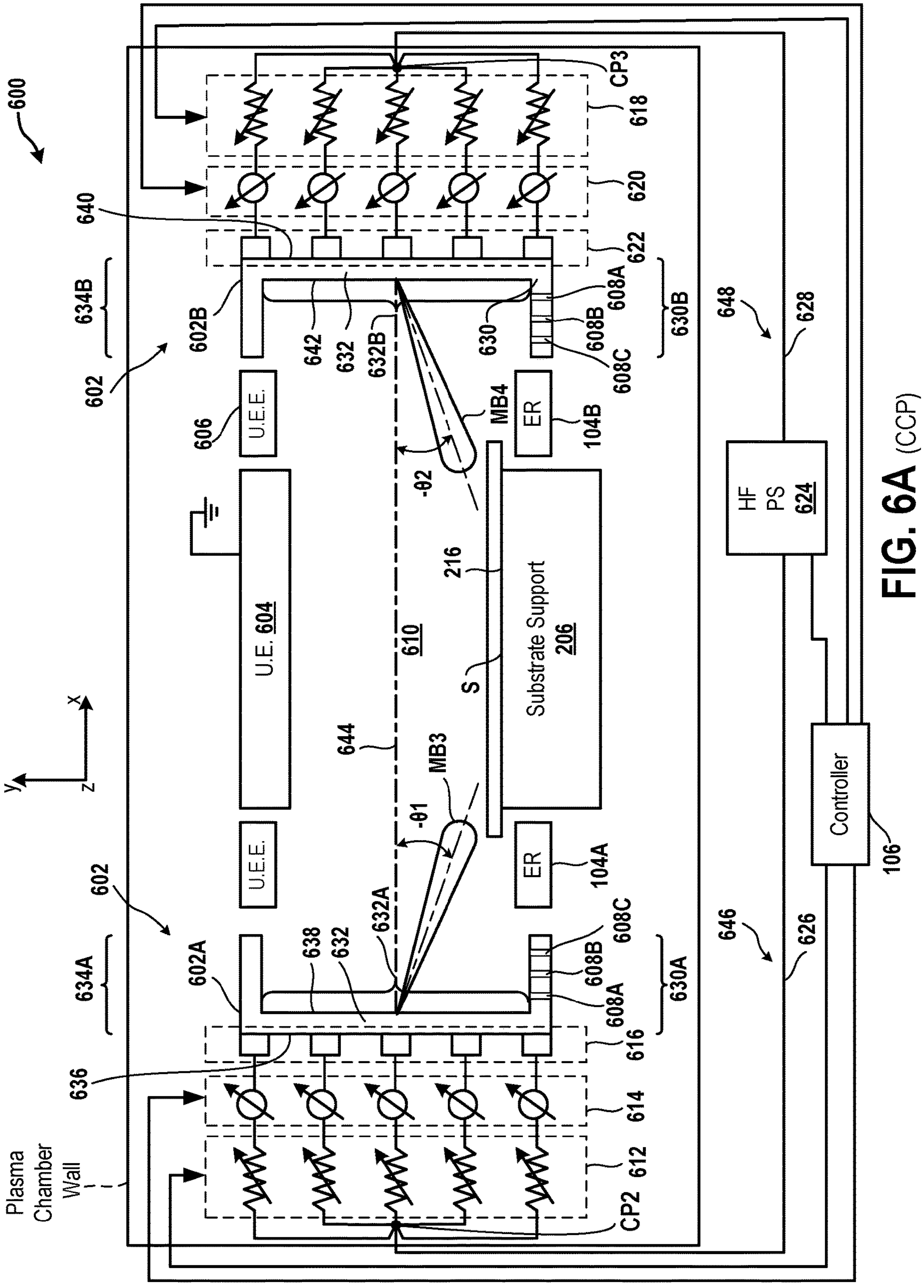
FIG. 6A (CCP)

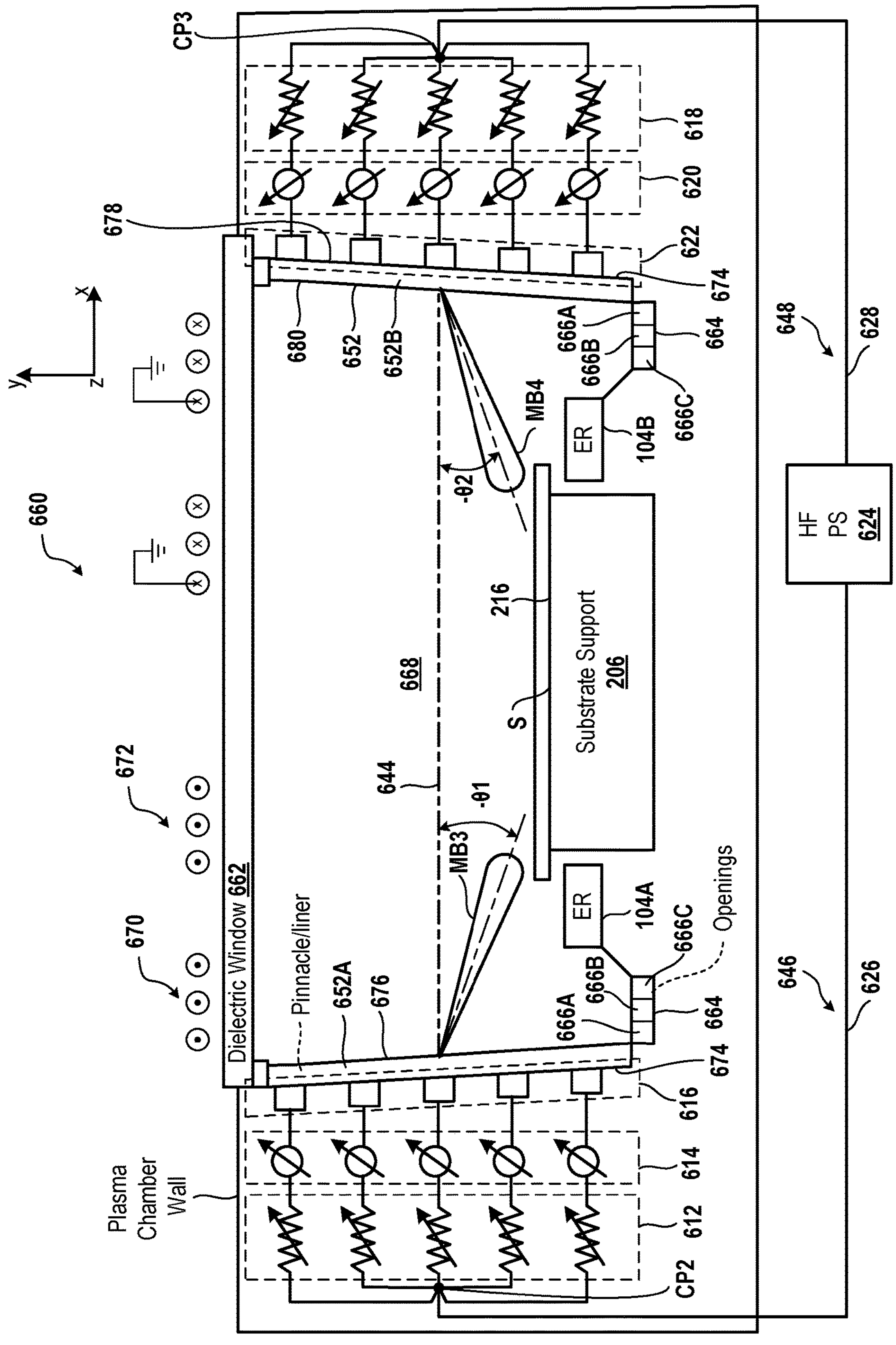
FIG. 6B (Beam Formation) (ICP)

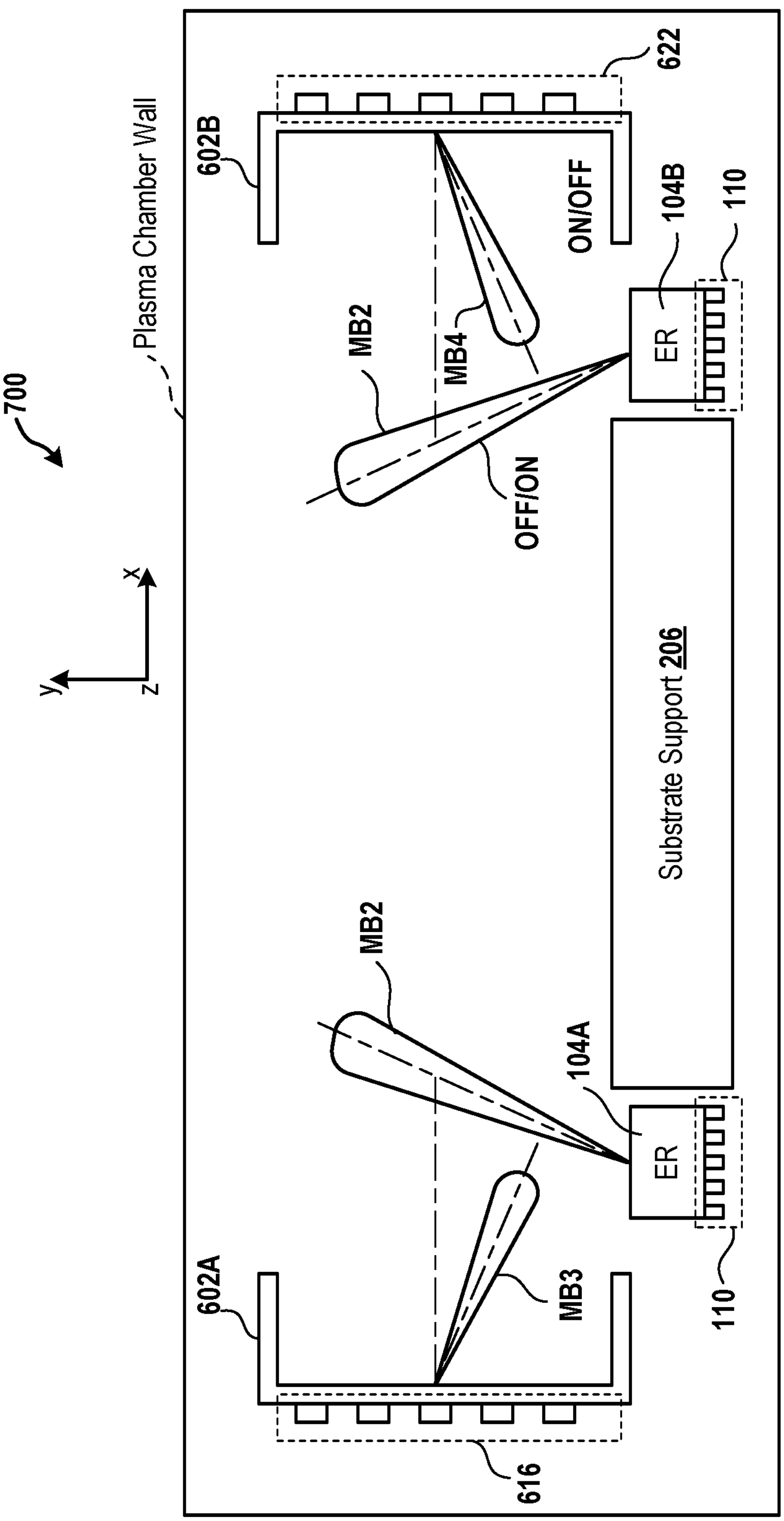
FIG. 7A (Dual-bean) (CCP)

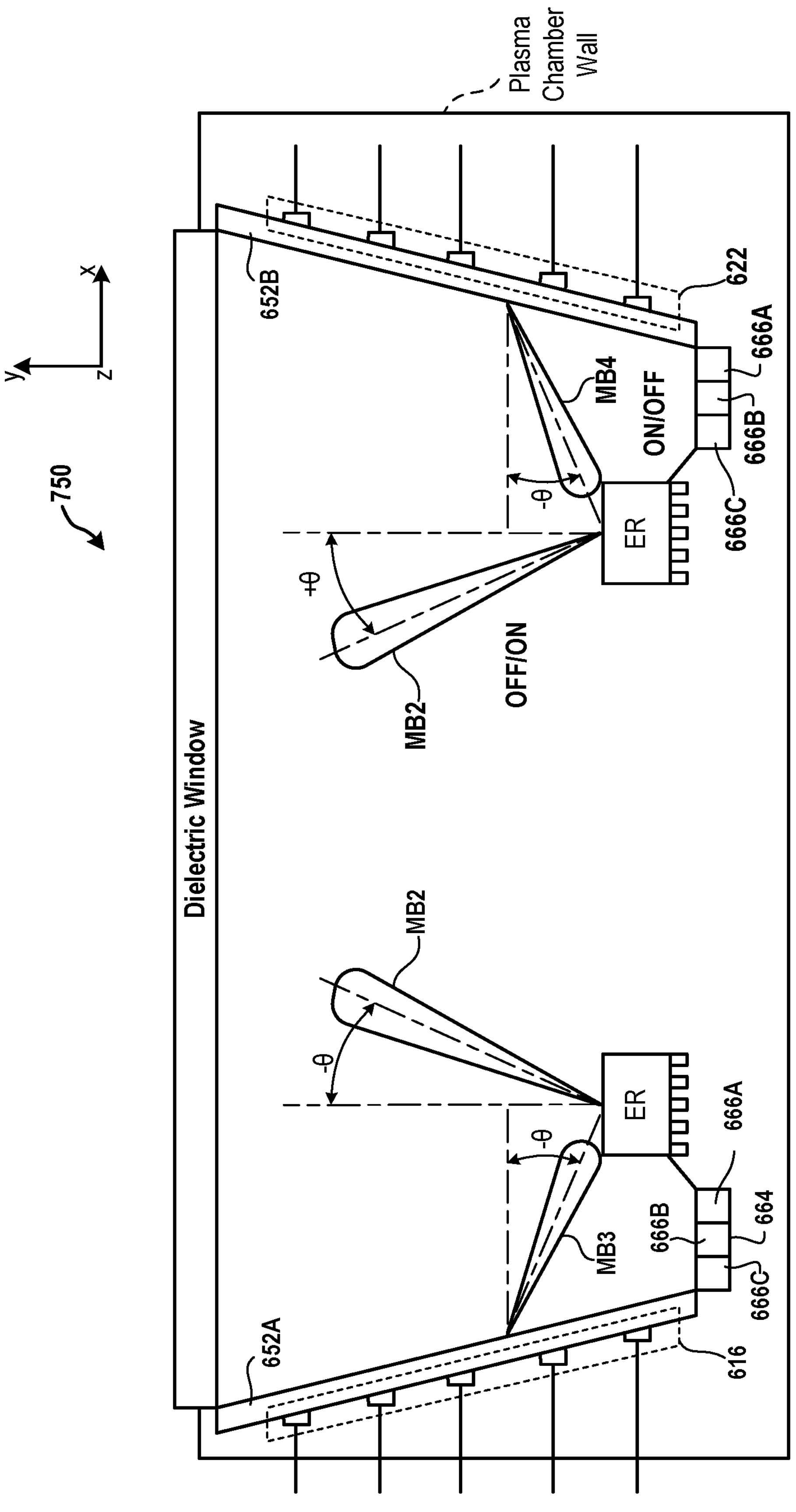
FIG. 7B (Dual-beam Formation) (ICP)

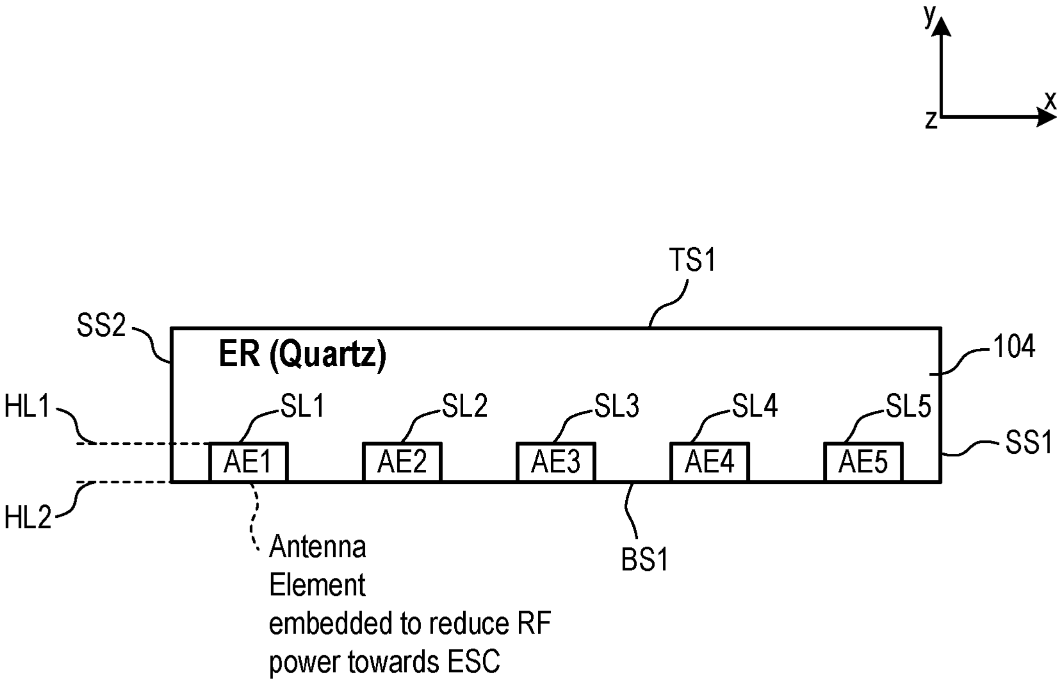
FIG. 8A (Antenna Elements Embedded)

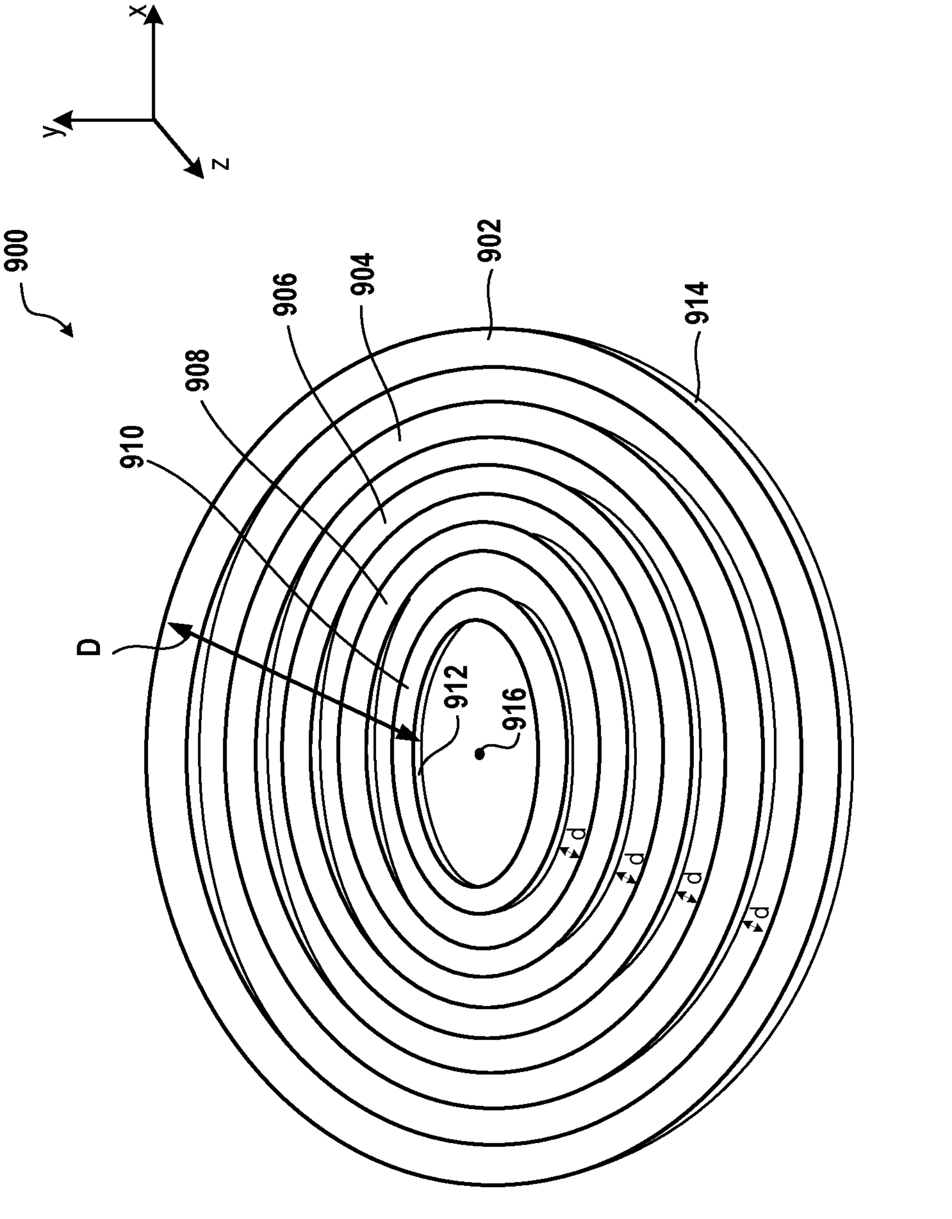
FIG. 9 (Antenna Elements For Uniformity Control)

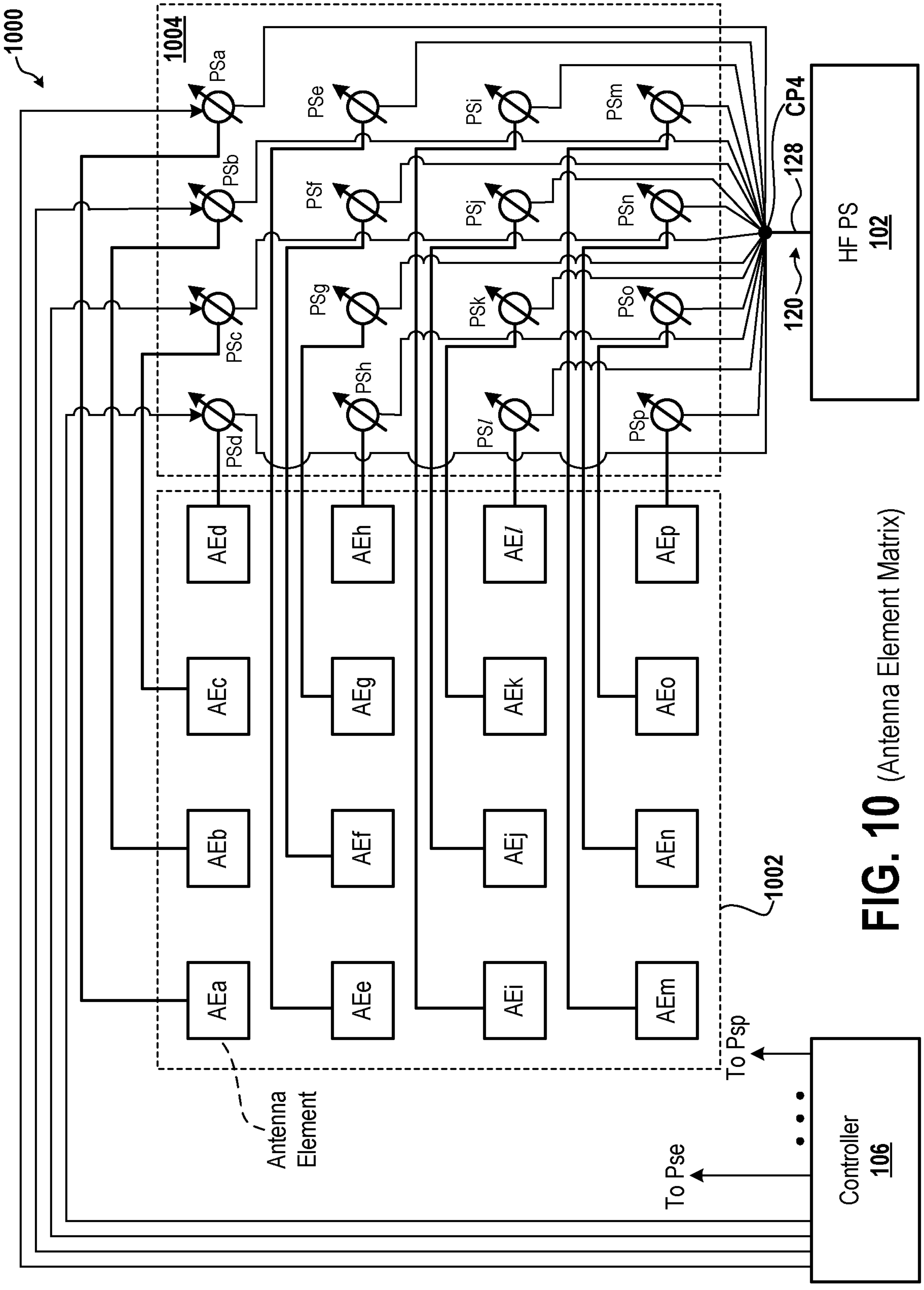
FIG. 10 (Antenna Element Matrix)

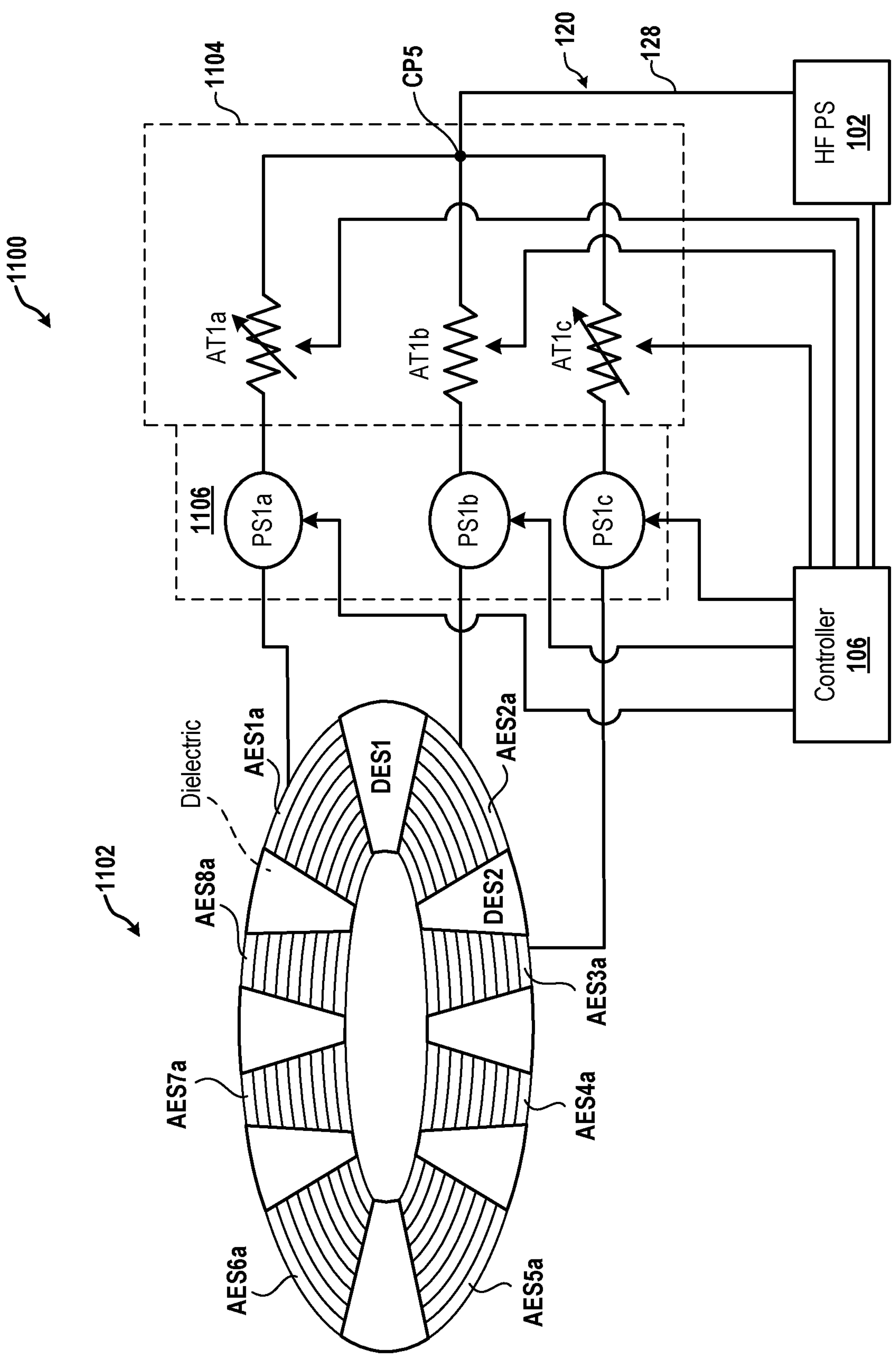
FIG. 11 (System for Edge or Azimuthal Uniformity Control)

PHASED ARRAY ANTENNAS AND METHODS FOR CONTROLLING UNIFORMITY IN PROCESSING A SUBSTRATE

CLAIM OF PRIORITY

This application is a national stage filing of and claims priority, under 35 U.S.C. § 371, to PCT/US2022/047057, filed on Oct. 18, 2022 and titled "PHASED ARRAY ANTENNAS AND METHODS FOR CONTROLLING UNIFORMITY IN PROCESSING A SUBSTRATE", which claims the benefit of and priority, under 35 U.S.C. § 119 (e), to U.S. Provisional Patent Application No. 63/273,680, filed on Oct. 29, 2021, and titled "PHASED ARRAY ANTENNAS AND METHODS FOR CONTROLLING UNIFORMITY IN PROCESSING A SUBSTRATE", all of which are incorporated by reference herein in their entirety.

FIELD

The embodiments described in the present disclosure relate to phased array antennas and methods for controlling uniformity in processing a substrate.

BACKGROUND

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

One or more radiofrequency (RF) generators generate one or more RF signals and supply the RF signals to a plasma reactor. The plasma reactor has a semiconductor wafer that is etched when the one or more RF signals are supplied and an etchant gas is supplied to the plasma reactor. However, a limit of an amount of uniformity in processing the semiconductor wafer is reached. Also, when the one or more RF signals are supplied, a tilt is visible at an edge of the semiconductor wafer. The tilt is created by bending of a plasma sheath at the edge of the semiconductor wafer or discontinuity between the semiconductor wafer and parts of the plasma reactor surrounding the semiconductor wafer. The plasma sheath bends over time as a result of erosion of one or more components within the plasma reactor. Because the bending occurs as a result of erosion of the one or more components, the bending and the tilt continuously drift over a period of time.

It is in this context that embodiments described in the present disclosure arise.

SUMMARY

Embodiments of the disclosure provide phased array systems, methods and computer programs for controlling uniformity in processing a substrate. It should be appreciated that the present embodiments can be implemented in numerous ways, e.g., a process, an apparatus, a system, a piece of hardware, or a method on a computer-readable medium. Several embodiments are described below.

In some embodiments, the phased array systems that are attached to multiple parts of a plasma chamber, such as a dielectric etch (DE) chamber or a conductor etch (CE) chamber, are described. For example, a high frequency (HF) radio frequency (RF) delivery path for phased array antenna elements under an edge ring or embedded within the edge ring, and a modification of edge ring are described. In the example, when the phased array antenna elements are embedded within the edge ring, electrical connections to the phased array antenna elements are provided at a bottom surface of the edge ring. As another example, an HF RF delivery path for phased array antennas coupled to a wall, such as a pinnacle or a C-shroud, and a modification of the wall are described. Also, as yet another example, an HF power source and its controller are provided to adjust a power level and a phase or delay between the antenna elements.

In one embodiment, a phased array antenna is a collection of the antenna elements assembled together such that a radiation pattern output from each of the antenna elements constructively combines with radiation patterns output from neighboring ones of the antenna elements to form an effective radiation pattern called an HF power beam or a main lobe. The HF power beam transmits radiated energy in a desired location while the phased array antenna destructively interferes with signals that form nulls and side lobes in undesired directions.

In an embodiment, the phased antenna array maximizes energy radiated in the HF power beam while reducing energy radiated in the side lobes to an acceptable level. A direction of the HF power beam can be manipulated by changing a phase of a signal fed into each of the antenna elements. Also, parameters of the phased antenna array, such as a length of the phased antenna array, a gap between the antenna elements, an arrangement of the antenna elements, a frequency used to define a property of the HF power beam, and phase differences between signals received by the antenna elements, are controlled to define steering characteristics. Examples of the steering characteristics include a width and an angle of the HF power beam. By controlling the steering characteristics of the HF power beam, an impedance of plasma within the plasma chamber is adjusted locally. The entire plasma volume is not illuminated but a specific area or a volume within the plasma chamber is adjusted. The beam will couple to the specific area or the volume within the plasma chamber to strike the plasma within the specific area or the volume.

In one embodiment, the phase between RF waveforms output from the antenna elements is controlled in an analog manner by using a Butler matrix with switches. The Butler matrix having switches defines different paths to modify phases of signals applied to the antenna elements.

In an embodiment, phases between signals applied to the antenna elements are controlled digitally with an electronic controller, such as a field programmable gate array (FPGA), and a fast control RF phase shifter and amplifier.

In one embodiment, the antenna elements are coupled to the edge ring to adjust the plasma at an edge region within the plasma chamber.

In an embodiment, the antenna elements are coupled to the wall.

In one embodiment, a first set of antenna elements is coupled to the edge ring and a second set of antenna elements is coupled to the wall to have a larger control on the plasma and the edge region within the plasma chamber.

In an embodiment, the phased array antenna is fabricated on a printed circuit board (PCB) and therefore, is repeatable. Also, because the phased antenna array is repeatable, any difference between two separate phased antenna arrays can be adjusted electronically using a digital attenuator and phase shifter.

In one embodiment, calibration is performed before processing the substrate to check that the antenna elements and connections, such as conductive lines, to the antenna elements do not have intrinsic delays. If so, the intrinsic delays are compensated to assure an applied phase is the actual one.

In an embodiment, the digital attenuator or another attenuator, such as an analog attenuator, is calibrated to assure that each of the antenna elements radiates substantially the same amount of power as another one of the antenna elements to generate the HF power beam, which is narrow and focused. The narrow HF power beam is generated by having a desirable constructive interference pattern at the HF power beam and a desirable destructive pattern outside the HF power beam.

In one embodiment, a system for directing a main beam towards a gap within a plasma chamber is described. The system includes a first power source that generates a first RF signal. The system further includes a plurality of phase shift circuits coupled to the first power source via a connection point. The plurality of phase shift circuits includes a first phase shift circuit and a second phase shift circuit. The connection point is splits the first RF signal into a plurality of input signals. The plurality of input signals includes a first input signal and a second input signal. The first phase shift circuit receives the first input signal to output the first input signal. The second phase shift circuit receives the second input signal and modifies a phase of the second input signal to output a phase-shifted signal. The system includes a plurality of antenna elements coupled to the plurality of phase shift circuits. The plurality of antenna elements includes a first antenna element and a second antenna element. The first antenna element receives the first input signal from the first phase shift circuit and the second antenna element receives the phase-shift signal from the second phase shift circuit to form the main beam that is directed at an angle towards the gap within the plasma chamber.

In an embodiment, a system for directing a main beam towards a gap within a plasma chamber is described. The system includes a first power source that generates a first RF signal. The system further includes a plurality of attenuation elements coupled to the first power source via a connection point. The plurality of attenuation elements includes a first attenuation element and a second attenuation element. The connection point splits the first RF signal into a plurality of input signals. The plurality of input signals includes a first input signal and a second input signal. The first attenuation element receives the first input signal to output a first attenuated signal and the second attenuation element receives the second input signal to output a second attenuated signal. The system further includes a plurality of phase shift circuits coupled to the plurality of attenuation elements. The plurality of phase shift circuits includes a first phase shift circuit and a second phase shift circuit. The first phase shift circuit receives the first attenuated signal to output the first attenuated signal. The second phase shift circuit receives the second attenuated signal and modifies a phase of the second attenuated signal to output a phase-shifted signal. The system includes a plurality of antenna elements coupled to the plurality of phase shift circuits. The plurality of antenna elements includes a first antenna element and a second antenna element. The first antenna element receives the first attenuated signal from the first phase shift circuit and the second antenna element receives the phase-shift signal from the second phase shift circuit to form the main beam that is directed at an angle towards the gap within the plasma chamber.

In one embodiment, a system for directing a main beam towards a gap within a plasma chamber is provided. The system includes an edge ring and a plurality of antenna elements coupled to the edge ring. The plurality of antenna elements includes a first antenna element and a second antenna element. The first antenna element receives a radio frequency (RF) signal having a phase and the second antenna element receives a phase-shifted signal. The phase-shifted signal has a phase that is shifted with respect to the phase of the RF signal to output the main beam towards the gap within the plasma chamber.

Some advantages of the herein described phased array antennas and methods for controlling uniformity in processing the substrate include providing the phased array systems to adjust, compensate, or increase plasma uniformity or sheath bending at an edge of the substrate. The plasma uniformity is adjusted by using the HF power beam, which can be steered in a direction to modify characteristics of the plasma in the plasma chamber. The controller provides a set point to apply power or phase or a combination thereof to achieve the angle of the HF power beam to couple the HF power beam with the plasma at a specific location.

Additional advantages of the herein described systems and methods include adjusting or correcting for many recipes and applications, including a dedicated recipe. The directionality of the HF power beam facilitates achieving the recipes and application compared to another edge ring that emits RF power in all directions in the plasma chamber. The other edge ring is not coupled to the phased antenna array. Further advantages include using a lower amount of power for generating the HF power beam than an amount of power provided to the other edge ring for emitting in all the directions. The lower amount of power is used because all the power is focused and directed instead of being dissipated in all the directions. Further advantages of the HF power beam include bending a plasma sheath at the edge region of the plasma chamber up to a mid-outer radius of the substrate. Additional advantages of the herein the HF power beam include bending the plasma sheath only at the edge region of the plasma chamber without being the plasma sheath at the mid-outer radius of the substrate.

Some other aspects will become apparent from the following detailed description, taken in conjunction with the accompanying drawings.

BRIEF DESCRIPTION OF THE DRAWINGS

The embodiments are understood by reference to the following description taken in conjunction with the accompanying drawings.

FIG. 1A-2 is a diagram of an embodiment of a system illustrate operation of a controller, a high frequency power source (HFPS), a phase shifter, and an antenna array.

FIG. 1B is a diagram of an embodiment of a system to illustrate a main beam and an edge ring within a plasma chamber.

FIG. 1C is a diagram of an embodiment of a system to illustrate formation of a main beam, which forms a negative angle $-\theta$ with respect to a vertical axis.

FIG. 2 is a diagram of an embodiment of a system to illustrate use of an antenna array with a substrate support.

FIG. 3A-1 is a diagram of an embodiment of a system to illustrate an attenuator array.

FIG. 3A-2 is a diagram of an embodiment of a system to illustrate details of operation of the attenuator array of FIG. 3A-1.

FIG. 3B is a diagram of an embodiment of a system to illustrate a change in resistance of an attenuator based on an amount of gain indicated by a control signal.

FIG. 4A is a circuit diagram of an embodiment of a phase shift circuit.

FIG. 4B is a circuit diagram of an embodiment of another phase shift circuit.

FIG. 4C is a circuit diagram of an embodiment of yet another phase shift circuit.

FIG. 4D is a circuit diagram of an embodiment of another phase shift circuit.

FIG. 4E is a circuit diagram of an embodiment of yet another phase shift circuit.

FIG. 6A is a diagram of an embodiment of a system to illustrate generation of a main beam and another main beam.

FIG. 6B is a diagram of an embodiment of a system to illustrate use of antenna arrays with a pinnacle of an inductively coupled plasma (ICP) chamber.

FIG. 7A is a diagram of an embodiment of a system to illustrate turning on and off of a main beam, and simultaneous turning on and off of another main beam.

FIG. 7B is a diagram of an embodiment of a system to illustrate turning on and off of a main beam, and simultaneous turning on and off of another main beam.

FIG. 8A is a diagram of an embodiment of an edge ring to illustrate that multiple antenna elements are embedded within the edge ring.

FIG. 9 is an isometric view of an embodiment of an antenna array.

FIG. 10 is a diagram of an embodiment of a system to illustrate a matrix of antenna elements.

FIG. 11 is a diagram of an embodiment of a system to illustrate an antenna array that is segmented and control of the antenna array.

DETAILED DESCRIPTION

The following embodiments describe phased array antennas and methods for controlling uniformity in processing a substrate. It will be apparent that the present embodiments may be practiced without some or all of these specific details. In other instances, well known process operations have not been described in detail in order not to unnecessarily obscure the present embodiments.

Figures 1, 1A:
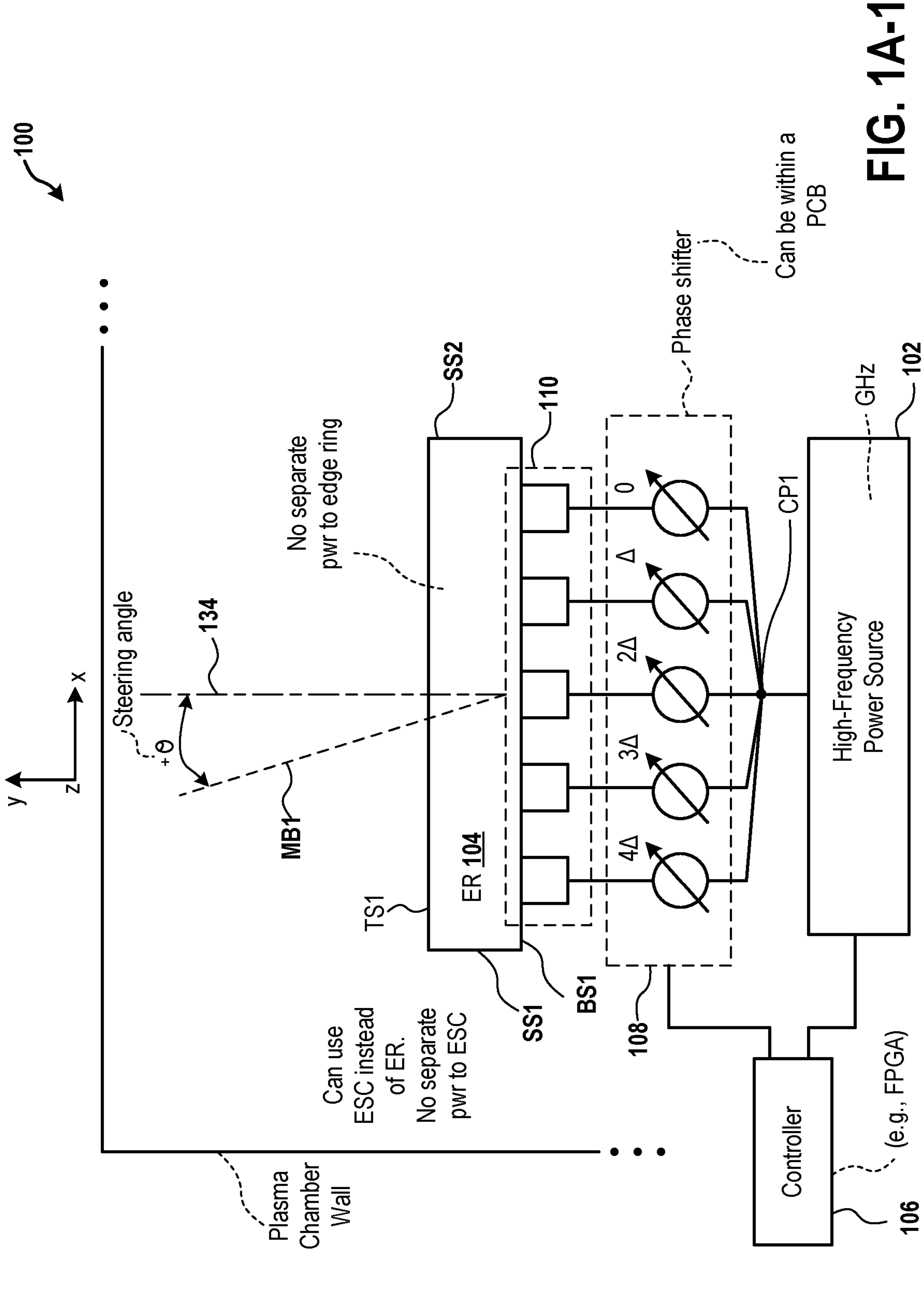
FIG. 1A-1 is a diagram of an embodiment of a system to illustrate generation of a main beam.

FIG. 1A-1 is a diagram of an embodiment of a system 100 to illustrate generation of a main beam MB1. The system 100 includes a high frequency power source (HFPS) 102, an edge ring (ER) 104, a controller 106, a phase shifter 108, and an antenna array 110. An example of the controller 106 includes a processor and a memory device. The processor is coupled to the memory device. Other examples of the controller 106 include an application specific integrated circuit (ASIC) and a programmable logic device (PLD). An example of the high frequency power source 102 includes a gigahertz (GHz) RF power supply, such as an oscillator, which generates a radio frequency (RF) signal having a frequency in gigahertz. To illustrate, the HFPS 102 has a frequency of operation that ranges between 15 GHz to 50 GHz. To further illustrate, the HFPS 102 has a frequency of operation that ranges between 25 GHz to 30 GHz. As another further illustration, the HFPS 102 has a frequency of operation that is 28 GHz. As another illustration, a frequency of operation of the HFPS 102 is greater than a frequency of plasma formed within a plasma chamber, such as an inductively coupled plasma (ICP) chamber or a conductively coupled plasma (CCP) chamber. This allows the main beam MB1 to penetrate through the plasma instead of being reflected back from the plasma towards the edge ring 104.

Figure 2:
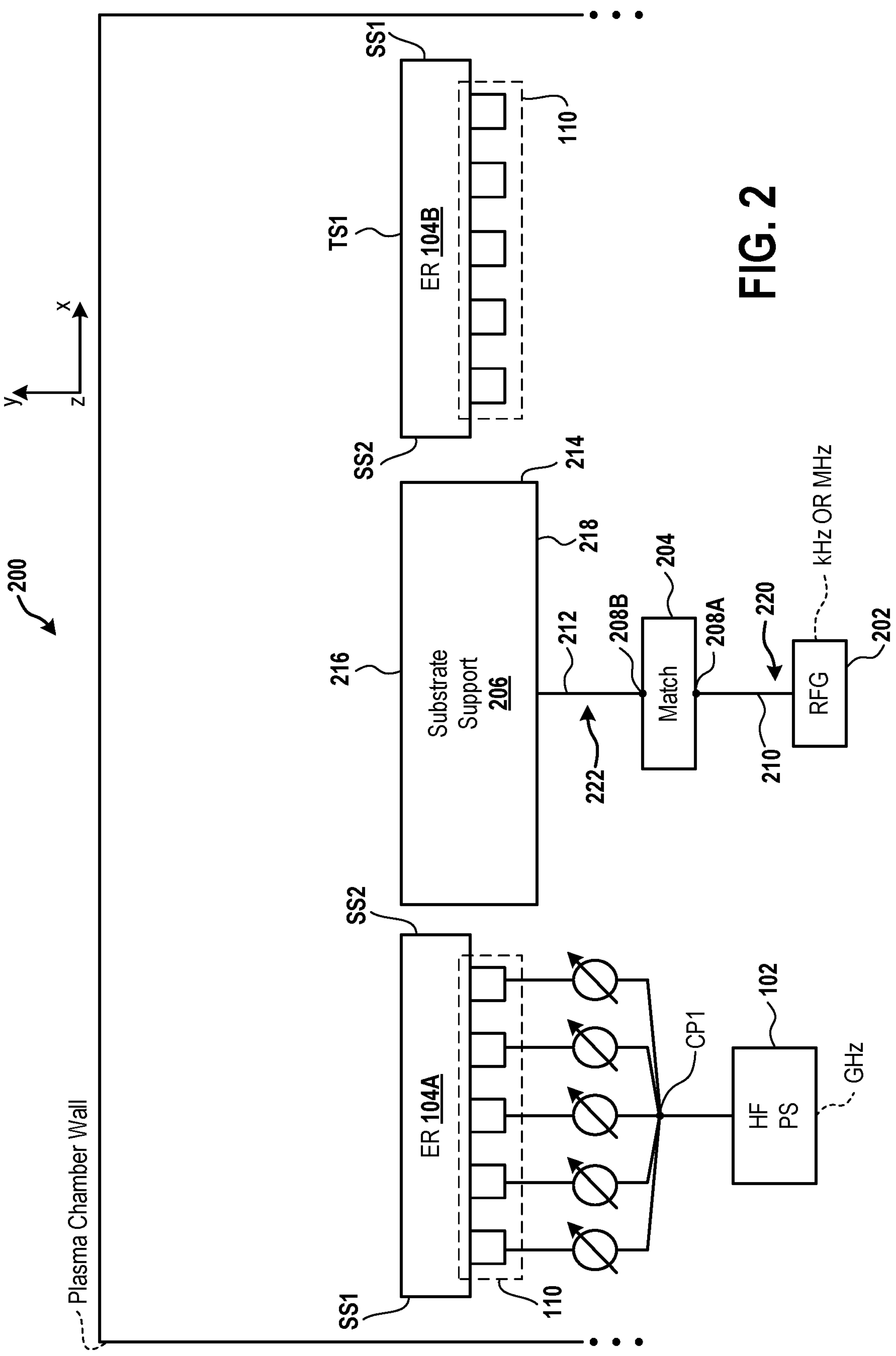

The phase shifter 108 includes a plurality of phase shift circuits PS1 through PS5 (FIG. 1A-2). As an example, each phase shift circuit PS1 through PS5 is a digital circuit or an analog circuit. To illustrate, the digital circuit is implemented within a printed circuit board (PCB). To further illustrate, the digital circuit is a PLD or an ASIC.

The antenna array 110 includes multiple antenna elements AE1 through AE5 (FIG. 1A-2). As an example, each antenna element, described herein, is fabricated from the same material that is used to fabricate an RF coil of the ICP chamber. To illustrate, each antenna element is fabricated from a cable of wires, and each wire is fabricated from a conductor metal, such as copper. In the illustration, each wire is conductive and is surrounded by a sheath of electrically insulating material. As another illustration, each antenna element is fabricated from a ferrite core.

The edge ring 104 is fabricated from a conductive material, such as silicon, or boron doped single crystalline silicon, or alumina, or silicon carbide, or silicon carbide layer on top of an alumina layer, or an alloy of silicon, or a combination thereof. As another example, the edge ring 104 is fabricated from quartz. As an example, the edge ring 104 has an annular shape. The edge ring 104 has a bottom surface BS1, a side surface SS1, a top surface TS1, and another side surface SS2. The side surface SS2 is an inner side surface and the side SS1 is an outer side surface. The edge ring 104 extends from the inner side surface to the outer side surface and from the top surface TS1 to the bottom surface BS1. The top surface TS1 faces plasma that is formed within the plasma chamber, and the bottom surface BS1 faces in a direction away from the plasma. For example, the bottom surface BS1 is located adjacent to a support ring, which is located below the edge ring 104.

The controller 106 is coupled to the HFPS 102 and to the phase shifter 108. The HFPS 102 is coupled via a connection point CP1 to the phase shifter 108. An example of a connection point, as used herein, is a conductive via or a conductive connector or a conductive solder or a combination of two or more thereof. Each phase shift circuit PS1 through PS5 of the phase shifter 108 is coupled to a corresponding one of the antenna elements AE1 through AE5. For example, the phase shift circuit PS1 is coupled to the antenna element PS1 and the phase shift circuit PS2 is coupled to the antenna element AE2 and so on until the phase shift circuit PS5 is coupled to the antenna element AE5.

The antenna array 110 is coupled to the edge ring 104. For example, each antenna element AE1 through AE5 is coupled to the bottom surface BS1 of the edge ring 104. To illustrate, each antenna element AE1 through AE5 is attached, such as fixed, to the bottom surface BS1. To further illustrate, each antenna element AE1 through AE5 is screwed to and/or soldered to and/or glued to the bottom surface BS1.

In one embodiment, the phase shifter 108 includes any other number of phase shift circuits, such as four or six or ten. Also, in the embodiment, the antenna array 110 includes the same number of antenna elements as that of the number of phase shift circuits.

In an embodiment, the edge ring 104 is not coupled to any other power supply, such as a kilohertz (kHz) RF generator or a megahertz (MHz) RF generator, besides the HFPS 102. This avoids generation of RF waveforms or RF wave fronts in all directions in the plasma chamber.

FIG. 1A-2 is a diagram of an embodiment of a system 122 to illustrate operation of the controller 106, the HFPS 102, the phase shifter 108, and the antenna array 110. The controller 106 is coupled via a separate connection to a respective one of the phase shift circuits PS1 through PS5. For example, the controller 106 is coupled via a connection 126A to the phase shift circuit PS1, via a connection 126B to the phase shift circuit PS2, via a connection 126C to the phase shift circuit PS3, via a connection 126D to the phase shift circuit PS4, and via a connection 126E to the phase shift circuit PS5. An example of a connection, as described herein, includes a conductor, such as a wire or a trace or a via or a conductive line or a combination of two or more thereof.

The HFPS 102 is coupled via a connection 128 to the connection point CP1. The connection point CP1 is coupled via a separate connection to a respective one of the phase shift circuits PS1 through PS5. For example, the connection point CP1 is coupled via a connection 130A to the phase shift circuit PS1, a connection 130B to the phase shift circuit PS2, a connection 130C to the phase shift circuit PS3, a connection 130D to the phase shift circuit PS4, and a connection 130E to the phase shift circuit PS5.

Also, each phase shift circuit PS1 through PS5 is coupled via a respective connection to a respective one of the antenna elements AE1 through AE5. For example, the phase shift circuit 132A is coupled via a connection 132A to the antenna element AE1, the phase shift circuit 132B is coupled via a connection 132B to the antenna element AE2, the phase shift circuit 132C is coupled via a connection 132C to the antenna element AE3, the phase shift circuit 132D is coupled via a connection 132D to the antenna element AE4, and the phase shift circuit 132E is coupled via a connection 132E to the antenna element AE5.

The controller 106 provides a frequency level, such as a frequency of operation, and a power level to the HFPS 102. As an example, the frequency level is a statistical value, such as an average value or a median value, of frequencies of an RF signal 120 to be generated by the HFPS 102. To illustrate, the frequency level is a frequency of operation of the HFPS 102. As another example, the power level is an amplitude, such as peak-to-peak value or a zero-to-peak value, of power values of the RF signal 120 to be generated by the HFPS 102. After the frequency level and a power level are received from the controller 106, the HFPS 102 generates an RF signal 120 having the frequency level and the power level and sends the RF signal 120 to the connection point CP1 via the connection 128.

At the connection point CP1, the RF signal 120 is split into multiple input signals 122A, 122B, 122C, 122D, and 122E. Each input signal 122A, 122B, 122C, 122D, and 122E is an RF signal and has an amount of power that is within a pre-determined range from a pre-determined amount. For example, each input signal 122A through 122E has an equal or the same amount of power.

The controller 106 provides, via a respective one of the connections 126A through 126E, a respective amount of phase shift to be applied to a respective one of the phase shift circuits PS1 through PS5. The respective amount of phase shift is to be applied to a respective one of the input signals 122A-122E. For example, the controller 106 sends a control signal to the phase shift circuit PS1 via the connection 126A to not shift a phase $\phi 1$ of the input signal 122A. In the example, the controller 106 sends a control signal to the phase shift circuit PS2 via the connection 126B to shift a phase of the input signal 122B by a first pre-determined amount $\Delta\phi$ with reference to the phase of the input signal 122A, sends a control signal to the phase shift circuit PS3 via the connection 126C to shift a phase of the input signal 122C by a second pre-determined amount with reference to the phase of the input signal 122A, sends a control signal to the phase shift circuit PS4 via the connection 126D to shift a phase of the input signal 122D by a third pre-determined amount with reference to the phase of the input signal 122A, and sends a control signal to the phase shift circuit PS5 via the connection 126E to shift a phase of the input signal 122E by a fourth pre-determined amount with reference to the phase of the input signal 122A. To illustrate, the second pre-determined amount is twice the first pre-determined amount, the third pre-determined amount is three times the first pre-determined amount, and the fourth pre-determined amount is four times the first pre-determined amount.

As an example, a phase of a first signal shifts with respect to a phase of a second signal when the first signal is delayed with respect to the second signal or the second signal is delayed with respect to the first signal. To illustrate, the first signal has a power amplitude P1$a$ at a time t1 and a power amplitude P1$b$ at a time t2, and the second signal has a power amplitude P2$a$ at the time t1 and a power amplitude P2$b$ at the time t2. The time t2 occurs after the time t1. In the illustration, after shifting a phase of the first signal with respect to the second signal, the power amplitude P1$a$ of the first signal occurs at the time t2 instead of the time t1 or the power amplitude P2$a$ of the second signal occurs at the time t2 instead of the time t1.

Each of the phase shift circuits PS1 through PS5 shifts a phase of a respective one of the input signals 122A through 122E by a respective one of the amount of phase shifts received from the controller 106 to output a respective one of phase-shifted signals 124A, 124B, 124C, 124D, and 124E. For example, the phase shift circuit PS1 does not shift a phase of the input signal 122A to output the phase-shifted signal 124A, the phase shift circuit PS2 shifts the phase of the input signal 122B by the first pre-determined amount with respect to the phase of the input signal 122A to output the phase-shifted signal 124B, and the phase shift circuit PS3 shifts the phase of the input signal 122C by the second pre-determined amount with respect to the phase of the input signal 122A to output the phase-shifted signal 124C. Also in the example, the phase-shifted signal 124A has the same phase as that of the input signal 122A. In the example, the phase shift circuit PS4 shifts the phase of the input signal 122D by the third pre-determined amount with respect to the phase of the input signal 122A to output the phase-shifted signal 124E, and the phase shift circuit PS5 shifts the phase of the input signal 122E by the fourth pre-determined amount with respect to the phase of the input signal 122A to output the phase-shifted signal 124E.

Each of the phase shift circuits PS1 through PS5 provides a respective one of the phase-shifted signals 124A through 124E to a respective one of the antenna elements AE1 through AE5. For example, the phase shift circuit PS1 provides the phase-shifted signal 124A to the antenna element AE1, the phase shift circuit PS2 provides the phase-shifted signal 124B to the antenna element AE2, the phase shift circuit PS3 provides the phase-shifted signal 124C to the antenna element AE3, the phase shift circuit PS4 provides the phase-shifted signal 124D to the antenna element AE4, and the phase shift circuit PS5 provides the phase-shifted signal 124E to the antenna element AE5.

In response to receiving a respective one of the phase-shifted signals 124A through 124E, a respective one of the antenna elements AE1 through AE5 outputs RF waveforms via the edge ring 104. For example, upon receiving the phase-shifted signal 124A, the antenna element AE1 outputs a first RF waveform towards the edge ring 104. Also, in the example, upon receiving the phase-shifted signal 124B, the antenna element AE2 outputs a second RF waveform towards the edge ring 104 and upon receiving the phase-shifted signal 124C, the antenna element AE3 outputs a third RF waveform towards the edge ring 104. In the example, upon receiving the phase-shifted signal 124D, the antenna element AE4 outputs a fourth RF waveform towards the edge ring 104 and upon receiving the phase-shifted signal 124E, the antenna element AE5 outputs a fifth RF waveform towards the edge ring 104.

The edge ring 104 combines, such as superimposes, RF power of the first through fifth RF waveforms to output the main beam MB1 (FIG. 1A-1) in a vertical direction towards the plasma formed in the plasma chamber. The main beam MB1 is a lobe. The main beam MB1 is directed at an angle +θ (FIG. 1A-1) with respect to a vertical axis 134, which passes through a centroid of the antenna element AE3.

By controlling amounts of the phase shifts that are applied by the phase shift circuits PS1 through PS5 to the respective one of the input signals 122A through 122E, the angle +θ of the main beam MB1 with respect to the vertical axis 134 is controlled, such as increased or decreased. For example, when the third pre-determined amount of phase shift is thrice the phase of the input signal 122A instead of being twice the phase of the input signal 122A, the angle +θ of the main beam MIB1 increases with reference to the vertical axis 134 by moving further to the left than that illustrated in FIG. 1A-1. As another example, when the third pre-determined amount of phase shift is one and a half times the phase of the input signal 122A instead of being twice the phase of the input signal 122A, the angle +θ of the main beam MB1 decreases with reference to the vertical axis 134 by moving further to the right than that illustrated in FIG. 1A-1.

In one embodiment, lengths of each of the connections 130A through 130E is calibrated, during a calibration operation, to allow a reception of the amount of power that is within the pre-determined range from the pre-determined amount by a respective one of the phase shift circuits PS1 through PS5 from the connection point CP1. For example, the connection 130A has a first length, the connection 130B has a second length, and the first and second lengths are calibrated to enable a transfer of a first amount of power of the input signal 122A from the connection point CP1 via the connection 130A to the phase shift circuit PS1 and a second amount of power of the input signal 122B from the connection point CP2 via the connection 130B to the phase shift circuit PS2. The first amount is equal to the second amount. The lengths of the connections 130A through 130E are calibrated before processing a substrate S in the plasma chamber.

In an embodiment, the lengths of the connections 130A through 130E are calibrated and determined based on measurements received from power sensors. For example, during the calibration operation, an input of each phase shift circuit PS1 through PS5 is coupled to a respective power sensor. To illustrate, a first power sensor is coupled to a first input of the phase shift circuit PS1 and a second power sensor is coupled to a second input of the phase shift circuit PS2. In the illustration, the first input is coupled to the connection 130A and the second input is coupled to the connection 130B. Also, in the illustration, the connection point CP1 is coupled to the first input of the phase shift circuit PS1 via the connection 130A of the first length and the connection point CP2 is coupled to the second input of the phase shift circuit PS2 via the connection 130B of the second length. In the illustration, the controller 106 is coupled to the first and second power sensors. Further, in the illustration, the controller 106 determines whether a power amount received from a respective one of the power sensors is within the pre-determined range from the pre-determined amount. To further illustrate, the controller 106 determines whether the first amount of power received from the first power sensor is equal to the second amount of power received from the second power sensor. In the further illustration, upon determining that the first amount of power is equal to the second amount of power, the controller 106 determines the connection 130A to have the first length and the connection 130B to have the second length.

In one embodiment, in addition to the main beam, multiple secondary beams are generated. The secondary beams have smaller lobes compared to the lobe of the main beam.

FIG. 1B is a diagram of an embodiment of a system 140 to illustrate the main beam MB1 and the edge ring 104 within the plasma chamber. The system 140 includes the edge ring 104, the HFPS 102, the phase shifter 108, and the antenna array 110. It should be noted that the edge ring 104 is annular in shape and as such, when a cross-section view of the edge ring 104 is taken, two portions 104A and 104B of the edge ring 104 are visible. The portion 104A is illustrated as a left edge ring 104 in FIG. 1B and the second portion 104B is illustrated as a right edge ring 104 in FIG. 1B. For example, the edge ring 104 is symmetric with respect to a center axis 142. In the example, the center axis 142 is located at a center of a circle formed by the side surface SS1 of the edge ring 104 or at a center of a circle formed by the side surface SS2 of the edge ring 104. Also, each antenna element AE1 through AE5 is annular in shape. As an example, each antenna element AE1 through AE5 has a shape of a ring with a through hole.

When the RF signal 120 is generated and supplied, the main beam MB1 is generated. The main beam MB1 forms the angle +θ with respect to the vertical axis 134 all along the edge ring 104. For example, the main beam MB1 is annular in shape. To further illustrate, the main beam MB1 extends in the vertical direction of a y-axis and extends horizontally along a circumference of the edge ring 104. In the example, multiple vertical axes, such as the vertical axis 134, extend along the circumference of the edge ring 104 to form a vertical plane along the circumference of the edge ring 104. Further, in the example, the vertical axis 134 passes through a point 144A on the portion 104A and the vertical axis 134 passes through a point 144B on the portion 104B. In the example, each of the points 144A and 144B is located at a half distance from the vertical axis 142. Also, in the example, the half distance is a distance at half of a difference between an outer diameter of the edge ring 104 and an inner diameter of the edge ring 104. Further, in the example, the inner diameter is twice a radius of the side surface SS2 as measured from the vertical axis 142 and the outer diameter is twice a radius of the side surface SS1 as measured from the vertical axis 142. In the example, at each point 144A and 144B, the main beam MB1 forms the angle +θ with respect to the vertical axis 134.

FIG. 1C is a diagram of an embodiment of the system 140 to illustrate formation of a main beam MB2, which forms a negative angle −θ with respect to the vertical axis 134. The controller 106 provides, via a respective one of the connections 126A through 126E (FIG. 1A-2), an amount of phase shift to be applied to a respective one of the input signals 122A-122E to a respective one of the phase shift circuits PS1 through PS5. For example, the controller 106 sends a control signal to the phase shift circuit PS5 via the connection 126E to not shift a phase ϕ2 of the input signal 122E. In the example, the controller 106 sends a control signal to the phase shift circuit PS4 via the connection 126D to shift a phase of the input signal 122D by the first pre-determined amount Δϕ with reference to the phase of the input signal 122E, sends a control signal to the phase shift circuit PS3 via the connection 126C to shift a phase of the input signal 122C by the second pre-determined amount with reference to the phase of the input signal 122E, sends a control signal to the phase shift circuit PS2 via the connection 126B to shift a phase of the input signal 122B by the third pre-determined amount with reference to the phase of the input signal 122E, and sends a control signal to the phase shift circuit PS1 via the connection 126A to shift a phase of the input signal 122A by the fourth pre-determined amount with reference to the phase of the input signal 122E. To illustrate, the second pre-determined amount is twice the first pre-determined amount, the third pre-determined amount is three times the first pre-determined amount, and the fourth pre-determined amount is four times the first pre-determined amount.

Each of the phase shift circuits PS1 through PS5 shifts a phase of a respective one of the input signals 122A through 122E by a respective one of the amount of phase shifts received from the controller 106 to output a respective one of phase-shifted signals 152A, 152B, 152C, 152D, and 152E. For example, the phase shift circuit PS5 does not shift a phase of the input signal 122E to output the phase-shifted signal 152E, the phase shift circuit PS4 shifts the phase of the input signal 122D by the first pre-determined amount with respect to the phase of the input signal 122A to output the phase-shifted signal 152D, and the phase shift circuit PS3 shifts the phase of the input signal 122C by the second pre-determined amount with respect to the phase of the input signal 122A to output the phase-shifted signal 152C. Also in the example, the phase-shifted signal 152E has the same phase as that of the input signal 122E. In the example, the phase shift circuit PS2 shifts the phase of the input signal 122B by the third pre-determined amount with respect to the phase of the input signal 122A to output the phase-shifted signal 152B, and the phase shift circuit PS1 shifts the phase of the input signal 122A by the fourth pre-determined amount with respect to the phase of the input signal 122E to output the phase-shifted signal 152A.

Each of the phase shift circuits PS1 through PS5 provides a respective one of the phase-shifted signals 152A through 152E to a respective one of the antenna elements AE1 through AE5. For example, the phase shift circuit PS1 provides the phase-shifted signal 152A to the antenna element AE1, the phase shift circuit PS2 provides the phase-shifted signal 152B to the antenna element AE2, the phase shift circuit PS3 provides the phase-shifted signal 152C to the antenna element AE3, the phase shift circuit PS4 provides the phase-shifted signal 152D to the antenna element AE4, and the phase shift circuit PS5 provides the phase-shifted signal 152E to the antenna element AE5.

In response to receiving a respective one of the phase-shifted signals 152A through 152E, a respective one of the antenna elements AE1 through AE5 outputs RF waveforms via the edge ring 104. For example, upon receiving the phase-shifted signal 152A, the antenna element AE1 outputs a first RF waveform towards the edge ring 104. Also, in the example, upon receiving the phase-shifted signal 152B, the antenna element AE2 outputs a second RF waveform towards the edge ring 104 and upon receiving the phase-shifted signal 152C, the antenna element AE3 outputs a third RF waveform towards the edge ring 104. In the example, upon receiving the phase-shifted signal 152D, the antenna element AE4 outputs a fourth RF waveform towards the edge ring 104 and upon receiving the phase-shifted signal 152E, the antenna element AE5 outputs a fifth RF waveform towards the edge ring 104. In the example, the edge ring 104 combines the first through fifth RF waveforms to output the main beam MB2 towards the plasma formed in the plasma chamber. The main beam MB2 is a lobe and is directed at the angle −θ with respect to the vertical axis 134. The angle −θ is formed with respect to the y-axis in a positive x-direction, which is opposite to a negative x-direction of an x-axis. The angle +θ is formed with respect to the y-axis in the negative x-direction. The x-axis is perpendicular to the y-axis. Each of the x-axis and the y-axis is perpendicular to a z-axis.

Figure 1E:
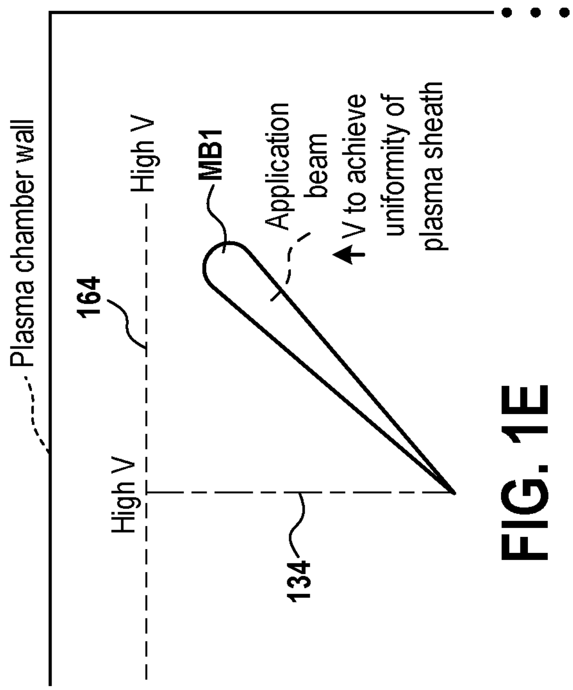
FIG. 1E is a diagram of an embodiment of a plasma sheath after a main beam is applied to the plasma sheath.
Figure 1D:
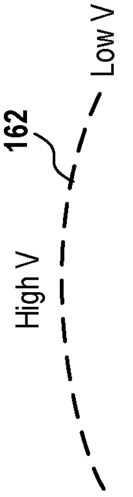
FIG. 1D is a diagram of an embodiment of a plasma sheath before a main lobe is applied to the plasma sheath.

FIG. 1D is a diagram of an embodiment of a plasma sheath 162 before a main lobe is applied to the plasma sheath 162. The plasma sheath 162 is of a convex shape having a high voltage (V) at its center and a low voltage at its edge. The high voltage is greater than the low voltage.

FIG. 1E is a diagram of an embodiment of a plasma sheath 164 after the main beam MB1 is applied. The main beam MB1 is directed towards the edge of the plasma sheath 162 to increase the low voltage at the edge of the plasma sheath 162 to the high voltage to increase uniformity of the plasma sheath 162. With the increase in the uniformity in the plasma sheath 162, the plasma sheath 164 is produced in the plasma chamber and the substrate S is processed in a uniform manner with the plasma sheath 164. For example, a tilt in features of the substrate S is reduced by directing the main beam MB1 towards the plasma. In the example, the tilt is created by the plasma without application of the main beam MB1.

Figure 1G:
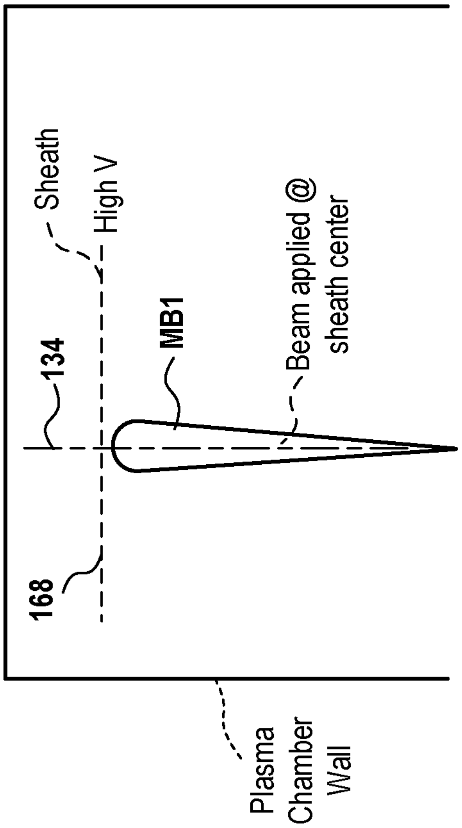
FIG. 1G is a diagram of an embodiment of a plasma sheath after a main beam is applied to the plasma sheath.
Figure 1F:
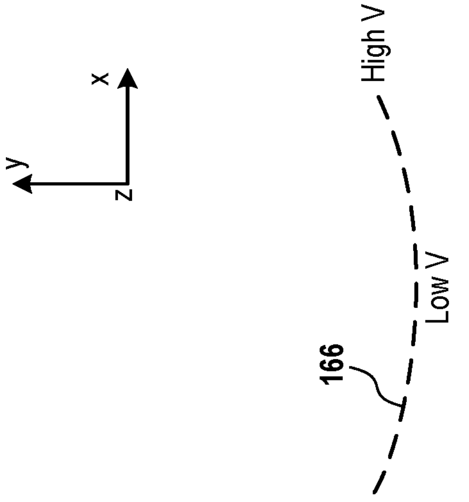
FIG. 1F is a diagram of an embodiment of a plasma sheath before a main lobe is applied to the plasma sheath.

FIG. 1F is a diagram of an embodiment of a plasma sheath 166 before a main lobe is applied to the plasma sheath 166. The plasma sheath 166 is of a concave shape having the high voltage at its edges and the low voltage at its center.

FIG. 1G is a diagram of an embodiment of a plasma sheath 168 after the main beam MB1 is applied. The main beam MB1 is directed towards the center of the plasma sheath 166 to increase the low voltage at the center of the plasma sheath 166 to the high voltage to increase uniformity of the plasma sheath 166. With the increase in the uniformity in the plasma sheath 166, the plasma sheath 168 is produced in the plasma chamber and the substrate S is processed in the uniform manner with the plasma sheath 168.

FIG. 2 is a diagram of an embodiment of a system 200 to illustrate use of the antenna array 110 with a substrate support 206. The system 200 includes the substrate support 206, the edge ring 104, the HFPS 102, an RF generator (RFG) 202, and a match 204.

An example of the substrate support 206 includes a chuck, such as an electrostatic chuck (ESC). The substrate support 206 has embedded within it a lower electrode, which is fabricated from a metal, such as aluminum or an alloy of aluminum. The substrate support 206 has a side surface 214, a top surface 216, and a bottom surface 218. The top surface 216 faces the plasma formed within the plasma chamber and the bottom surface 218 is in a direction facing away from the plasma. The side surface 214 is between the top surface 216 and the bottom surface 218.

An example of the RFG 202 is a generator that has a frequency of operation in a kilohertz (kHz) range or in a megahertz (MHz) range. For example, the RFG has a frequency of operation of 400 kHz or 2 MHz or 27 MHz or 60 MHz.

The match 204 has an input 208A and an output 208B. A match, as used herein, is a network of circuit components, such as inductors, capacitors, and resistors. For example, the match includes one or more shunt circuits and one or more series circuits. Each shunt circuit has one or more of the circuit components and so does each series circuit. A branch circuit, which includes one or more shunt circuits or one or more series circuits or a combination thereof, of the match is coupled between the input 208A and the output 208B.

The RFG 202 is coupled via an RF cable 210 to the input 208A of the match 204. Also, the output 208B of the match 204 is coupled via an RF transmission line 212 to the lower electrode of the substrate support 206. An example of an RF transmission line, as used herein, includes an RF rod that is surrounded by an insulator material, which is surrounded by an RF sheath. As another example, an RF transmission line includes the RF rod surrounded by the RF sheath, and the RF rod is coupled to an RF cylinder. In the example, the RF cylinder is coupled to the lower electrode of the substrate support 206. As yet another example, an RF transmission line includes the RF rod surrounded by the RF sheath, and the RF rod is coupled to an RF cylinder via an RF strap. In the example, the RF cylinder is coupled to the lower electrode of the substrate support 206. Further in the example, the RF rod is coupled to the output 208B of the match 204 via an RF strap.

The edge ring 104 surrounds the substrate support 206. For example, the side surface SSs is adjacent to the side surface 214 of the substrate support 206, and so the edge ring 104 is adjacent to the substrate support 206. To illustrate, a diameter of the side surface SS2 is greater than a diameter of the side surface 214. The diameter of the side surface 214 is a diameter of the substrate support 206. As another illustration, there is no conductive ring between the substrate support 206 and the edge ring 104. To further illustrate, there is a dielectric ring between the substrate support 206 and the edge ring 104 but no ring that is conductive. A horizontal level, located along the x-axis, of the top surface TS1 of the edge ring 104 is lower than a horizontal level, located along the x-axis, of the top surface 216 of the substrate support 206.

The RF generator 202 generates an RF signal 220 and sends the RF signal 220 to the input 208A. The match 204 receives the RF signal 220 and matches an impedance of a load with an impedance of a source to modify an impedance of the RF signal 220. An example of the load includes the RF transmission line 212 and the plasma chamber having the substrate support 206, the edge ring 104, and the antenna array 110. An example of the source includes the RF cable 210 and the RF generator 202. The impedance of the RF signal 220 is modified to output a modified RF signal 222. The modified RF signal 222 is sent via the output 208B and the RF transmission line 212 to the lower electrode of the substrate support 206.

After the substrate S is placed on the top surface 216 of the substrate support 206, one or more process gases, such as an oxygen containing gas, a metal containing gas, a nitrogen containing gas, or a combination thereof, are provided to the plasma chamber. When the one or more process gases are provided in addition to the modified RF signal 222, the plasma is stricken or maintained within the plasma chamber. In addition to the supply of the modified RF signal 222, a main beam, such as the main beam MB1 or MB2, is generated within the plasma chamber and is directed towards the substrate S from the edge ring 104 to achieve the uniformity.

In one embodiment, the antenna array 110 is coupled to, such as attached to or fixed to or embedded within, the substrate support 206 (FIG. 2) instead of to the edge ring 104. For example, the antenna array 110 is fixed to the substrate support 206 via screws or glue or soldering or a combination thereof. In the embodiment, the match 204 and the RFG 303 are decoupled from the substrate support 206. There is no supply of kHz or MHz RF signal to the substrate support 206.

In an embodiment, another antenna array, same in structure and function as that of the antenna array 110, is coupled to the substrate support 206. Also, another phase shifter, same in structure and function as that of the phase shifter 108, is coupled to the other antenna array. Moreover, another HPFS, same in structure and function as that of the HFPS 102, is coupled to the other phase shifter. Also, in the embodiment, the antenna array 110 is coupled to the edge ring 104. In the embodiment, two main beams, including a first main beam and a second main beam, are generated. The first main beam is generated by the other antenna array and the second main beam is generated by the antenna array 110. In the embodiment, the other phase shifter is controlled in the same manner as that of the phase shifter 108. The other phase shifter is controlled in the same manner as that of the phase shifter 108 to be synchronized with the phase shifter 108 so that the first and second main beams are in phase with each other. When the first and second main beams are in phase with each other, tilt in features, such as channels, of the substrate S is reduced to be approximately zero or zero. Also, when there is no synchronization between the other phase shifter and the phase shifter 108, an average tilt of the features is zero or approximately zero and each of the features is wider. Each of the features is wider in diameter compared to a width of each of the features achieved when the other phase shifter is controlled in the same manner as that of the phase shifter 108.

Figures 1, 3A:
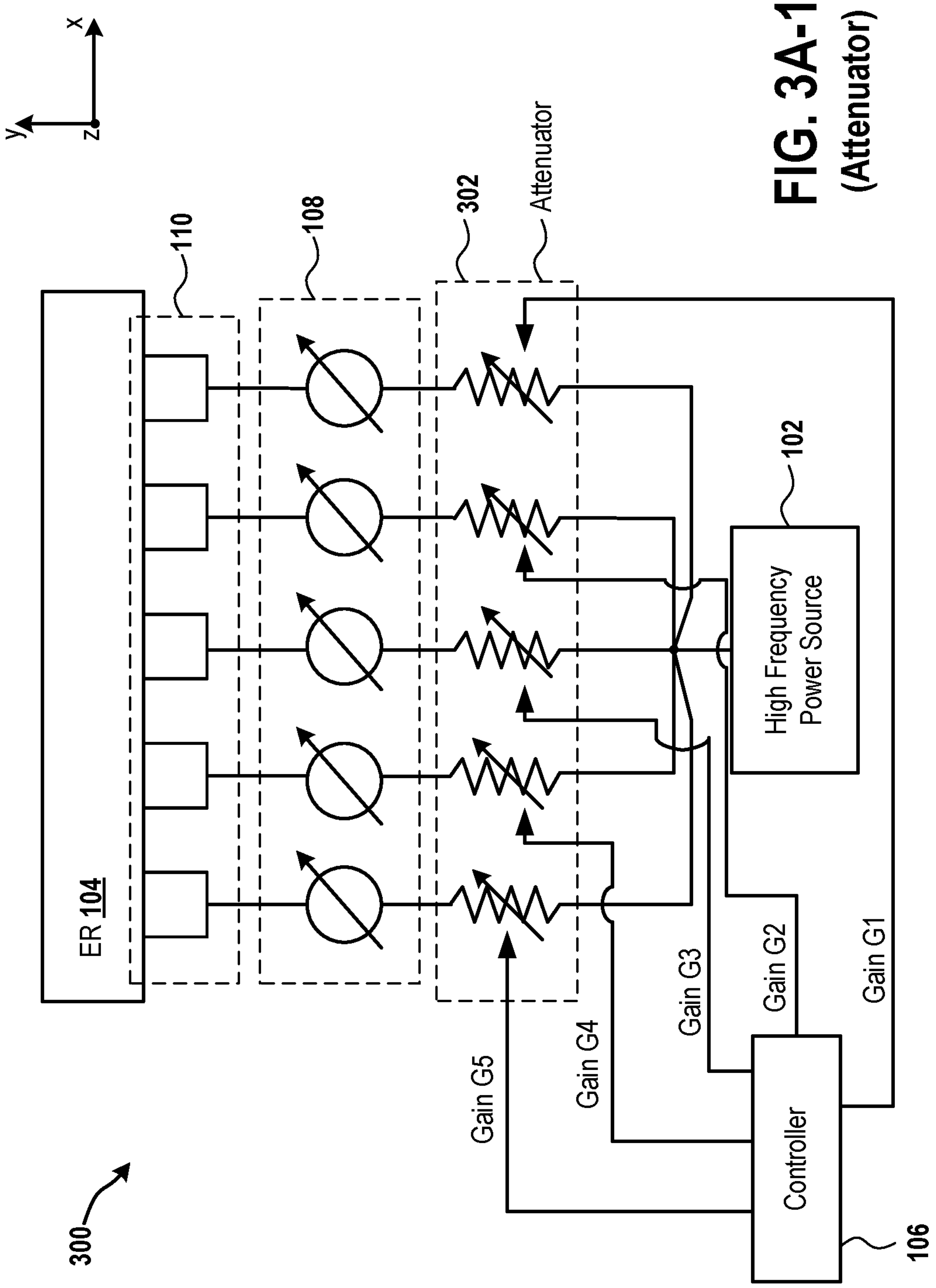

FIG. 3A-1 is a diagram of an embodiment of a system 300 to illustrate an attenuator array 302. The system 300 includes the controller 106, the HFPS 102, the attenuator array 302, the phase shifter 108, the antenna array 110, and the edge ring 104.

The HFPS 102 is coupled via the connection point CP1 to the attenuator array 302. The attenuator array 302 is coupled to the phase array 108. Also, the controller 106 is coupled to the attenuator array 302.

FIG. 3A-2 is a diagram of an embodiment of a system 310 to illustrate details of operation of the attenuator array 302. The system 310 includes the controller 106, the HFPS 102, the attenuator array 302, the phase array 108, and the antenna array 110. The attenuator array 302 includes multiple attenuators AT1, AT2, AT3, AT4, and AT5. An example of an attenuator includes a resistor or a group of resistors. To illustrate, the group of resistors includes two or more resistors that are coupled to each other in series. As another illustration, the group of resistors includes two or more resistors that are coupled to each other in a parallel. As yet another illustration, the group of resistors includes a first set of two or more resistors that are coupled to each other in series and a second set of two or more resistors that are coupled to each other in parallel. In the illustration, the first set is coupled to the second set. Examples of a resistor, as used herein, include a fixed resistor and a variable resistor.

The controller 106 is coupled via a separate connection to a respective one of the attenuators AT1 through AT5. For example, the controller 106 is coupled via a connection 312A to the attenuator AT1, via a connection 312B to the attenuator AT2, via a connection 312C to the attenuator AT3, via a connection 312D to the attenuator AT4, and via a connection 312E to the attenuator AT5.

The connection point CP1 is coupled via a separate connection to a respective one of the attenuators AT1 through AT5. For example, the connection point CP1 is coupled via the connection 130A to the attenuator AT1, via the connection 130B to the attenuator AT2, via the connection 130C to the attenuator AT3, via the connection 130D to the attenuator AT4, and via the connection 130E to the attenuator AT5.

Each of the attenuators AT1 through AT5 is coupled via a separate connection to a respective one of the phase shift circuits PS1 through PS5. For example, the attenuator AT1 is coupled via a connection 316A to the phase shift circuit PS1, the attenuator AT2 is coupled via a connection 316B to the phase shift circuit PS2, the attenuator AT3 is coupled via a connection 316C to the phase shift circuit PS3, the attenuator AT4 is coupled via a connection 316D to the phase shift circuit PS4, and the attenuator AT5 is coupled via a connection 316E to the phase shift circuit PS5.

The HFPS 120 supplies the RF signal 120 via the connection 128 to the connection point CP1. At the connection point CP1, the RF signal 120 is split into the input signals 122A through 122E.

The controller 106 sends, via a respective one of the connections 312A through 312E, a respective control signal to achieve a gain in an amplitude to be applied to a respective one of the input signals 122A-122E. The respective control signal is applied to a respective one of the attenuators AT1 through AT5. For example, the controller 106 sends a control signal 318A to the attenuator AT1 via the connection 312A to apply a gain G1 to an amplitude of the input signal 122A, sends a control signal 318B to the attenuator AT2 via the connection 312B to apply a gain G2 to an amplitude of the input signal 122B, sends a control signal 318C to the attenuator AT3 via the connection 312C to apply a gain G3 to an amplitude of the input signal 122C, sends a control signal 318D to the attenuator AT4 via the connection 312D to apply a gain G4 to an amplitude of the input signal 122D, and sends a control signal 318E to the attenuator AT5 via the connection 312E to apply a gain G5 to an amplitude of the input signal 122E. An example of an amplitude of a signal is a peak-to-peak amplitude or a zero-to-peak amplitude. As an example, a gain applied by an attenuator is a reduction in an amplitude of power of a signal that traverses through the attenuator. To illustrate, the gain is an attenuation in the amplitude of power of the signal passing through the attenuator. To further illustrate, the gain is a negative value based on which an amount of resistance is applied to the power of the signal to reduce the power according to a pre-determined amount. In the further illustration, the pre-determined amount is the negative value. As another illustration, each of the control signals 318A-318E is generated based on a respective amount of resistance of a respective one of the attenuators AT1 through AT5. Based on the resistance of a respective one of the attenuators AT1 through AT5, one of the gains G1 through G5 is achieved.

Each of the attenuators AT1 through AT5 apply a respective amount of resistance to achieve the respective ones of the gains G1 through G5 to further output a respective one of multiple attenuated signals 322A, 322B, 322C, 322D, and 322E. For example, the attenuator AT1 applies a first resistance to achieve the gain G1 to further output the attenuated signal 322A and the attenuator AT1 applies a second resistance to achieve the gain G2 to further output the attenuated signal 322B. To illustrate, the attenuator AT1 applies a first amount of resistance to the input signal 122A to output the attenuated signal 322A and applies a second amount of resistance to the input signal 122B to output the attenuated signal 322B.

Moreover, the controller 106 provides, via a respective one of the connections 126A-126E (FIG. 1A-2), an amount of phase shift to be applied to a respective one of the attenuated signals 322A-322E. The amount of phase shift is provided to a respective one of the phase shift circuits PS1 through PS5. For example, the controller 106 sends a control signal to the phase shift circuit PS1 via the connection 126A to not shift a phase $\phi 1$ of the attenuated signal 322A. In the example, the controller 106 sends a control signal to the phase shift circuit PS2 via the connection 126B to shift a phase of the attenuated signal 322B by the first pre-determined amount $\Delta\phi$ with reference to the phase of the attenuated signal 322A, sends a control signal to the phase shift circuit PS3 via the connection 126C to shift a phase of the attenuated signal 322C by the second pre-determined amount with reference to the phase of the attenuated signal 322A, sends a control signal to the phase shift circuit PS4 via the connection 126D to shift a phase of the attenuated signal 322D by the third pre-determined amount with reference to the phase of the attenuated signal 322A, and sends a control signal to the phase shift circuit PS5 via the connection 126E to shift a phase of the attenuated signal 322E by the fourth pre-determined amount with reference to the phase of the input signal 322A.

Each of the phase shift circuits PS1 through PS5 shifts a phase of a respective one of the attenuated signals 322A through 322E by a respective one of the amount of phase shifts received from the controller 106 to output a respective one of phase-shifted signals 324A, 324B, 324C, 324D, and 324E. For example, the phase shift circuit PS1 does not shift a phase of the attenuated signal 322A to output the phase-shifted signal 324A, the phase shift circuit PS2 shifts the phase of the attenuated signal 322B by the first pre-determined amount with respect to the phase of the attenuated signal 322A to output the phase-shifted signal 324B, and the phase shift circuit PS3 shifts the phase of the attenuated signal 322C by the second pre-determined amount with respect to the phase of the attenuated signal 322A to output the phase-shifted signal 324C. Also in the example, the phase-shifted signal 324A has the same phase as that of the attenuated signal 322A. In the example, the phase shift circuit PS4 shifts the phase of the attenuated signal 322D by the third pre-determined amount with respect to the phase of the attenuated signal 322A to output the phase-shifted signal 324E, and the phase shift circuit PS5 shifts the phase of the attenuated signal 322E by the fourth pre-determined amount with respect to the phase of the attenuated signal 122A to output the phase-shifted signal 324E.

Each of the phase shift circuits PS1 through PS5 provides a respective one of the phase-shifted signals 324A through 324E to a respective one of the antenna elements AE1 through AE5. For example, the phase shift circuit PS1 provides the phase-shifted signal 324A to the antenna element AE1, the phase shift circuit PS2 provides the phase-shifted signal 324B to the antenna element AE2, the phase shift circuit PS3 provides the phase-shifted signal 324C to the antenna element AE3, the phase shift circuit PS4 provides the phase-shifted signal 324D to the antenna element AE4, and the phase shift circuit PS5 provides the phase-shifted signal 324E to the antenna element AE5.

In response to receiving a respective one of the phase-shifted signals 324A through 324E, a respective one of the antenna elements AE1 through AE5 outputs RF waveforms via the edge ring 104. For example, upon receiving the phase-shifted signal 324A, the antenna element AE1 outputs the first RF waveform towards the edge ring 104. Also, in the example, upon receiving the phase-shifted signal 324B, the antenna element AE2 outputs the second RF waveform towards the edge ring 104 and upon receiving the phase-shifted signal 324C, the antenna element AE3 outputs the third RF waveform towards the edge ring 104. In the example, upon receiving the phase-shifted signal 324D, the antenna element AE4 outputs the fourth RF waveform towards the edge ring 104 and upon receiving the phase-shifted signal 324E, the antenna element AE5 outputs the fifth RF waveform towards the edge ring 104.

In an embodiment, the terms attenuator and attenuation element are used herein interchangeably. For example, each of the attenuators AT1 through AT5 is an attenuation element.

In one embodiment, a location of each of the attenuators AT1 through AT5 is switched with respect to a respective one of the phase shift circuits PS1 through PS5. For example, instead of the phase shifter 108 being coupled to the antenna array 110, the attenuator array 302 is coupled to the antenna array 110 and the phase shifter 108 is coupled to the connection point CP1. For example, the connection point CP1 is coupled via the connection 130A to the phase shift circuit PS1, which is coupled via the connection 316A to the attenuator AT1. Further in the example, the attenuator AT1 is coupled via the connection 132A to the antenna element AE1. As another example, the connection point CP2 is coupled via the connection 130B to the phase shift circuit PS2, which is coupled via the connection 316B to the attenuator AT2. Further in the example, the attenuator AT2 is coupled via the connection 132B to the antenna element AE2.

In one embodiment, each of the connections 130A through 130E has a length that is calibrated, during a calibration operation, to allow a reception of the amount of power that is within the pre-determined range from the pre-determined amount by a respective one of the attenuators AT1 through AT5. For example, the connection 130A has the first length, the connection 130B has the second length, and the first and second lengths are calibrated, such as adjusted, to enable a transfer of the first amount of power of the input signal 122A from the connection point CP1 via the connection 130A to the attenuator AT1 and a transfer of the second amount of power of the input signal 122B from the connection point CP2 via the connection 130B to the attenuator AT2. The first amount is equal to the second amount. The lengths of the connections 130A through 130E are calibrated during the calibration operation before processing the substrate S.

In an embodiment, the lengths of the connections 130A through 130E are calibrated and determined based on measurements received from power sensors. For example, during calibration, an input of each attenuator AT1 through AT5 is coupled to a respective power sensor. To illustrate, the first power sensor is coupled to a first input of the attenuator AT1 that is coupled to the connection 130A and the second power sensor is coupled to a second input of the attenuator AT2 that is coupled to the connection 130B. Also, in the illustration, the connection point CP1 is coupled to the attenuator AT1 via the connection 130A of the first length and the first input and the connection point CP2 is coupled to the attenuator AT2 via the connection 130B of the second length and the second input. In the illustration, the controller 106 is coupled to the first and second power sensors. Further, in the illustration, the controller 106 determines whether a power amount received from a respective one of the first and second power sensors is within the pre-determined range from the pre-determined amount. To further illustrate, the controller 106 determines whether a first amount of power received from the first power sensor coupled to the input of the attenuator AT1 is equal to a second amount of power received from the second power sensor coupled to the input of the attenuator AT2. In the further illustration, upon determining that the first amount of power is equal to the second amount of power, the controller 106 determines the connection 130A to have the first length and the connection 130B to have the second length.

In one embodiment, a resistance to be applied by a respective one of the attenuators AT1 through AT5 is determined or calibrated until an amount of power that is output from the respective one of the AT1 through AT5 is within a pre-determined range. For example, during the calibration operation, a power sensor is coupled to an output of a respective one of the attenuators AT1 through AT5. To illustrate, a first power sensor is coupled to a first output of the attenuator AT1 and a second power sensor is coupled to a second output of the attenuator AT2. In the illustration, the first and second power sensors are coupled to the controller 106. To further illustrate, the first power sensor is coupled to the first output that is coupled to the connection 316A and the second power sensor is coupled to second output that is coupled to the connection 316B. Further, in the illustration, during the calibration operation, a first amount of power is received from the first sensor by the controller 106 and a second amount of power is received from the second sensor by the controller 106. Continuing with the illustration, the controller 106 determines whether the first amount of power is within the pre-determined range and the second amount of power is within the pre-determined range. To further illustrate, the controller 106 determines whether the first amount of power is equal to the second amount of power. Further, in the further illustration, upon determining that the first amount of power is within the pre-determined range and the second amount of power is not within the pre-determined range, the controller 106 adjusts, such as increases or decreases, a resistance of the attenuator AT2 and does not adjust a resistance of the attenuator AT1. In the further illustration, the controller 106 sends a control signal to the attenuator AT2 to change the resistance of the attenuator AT2. In the example, after the resistance of the attenuator AT2 is adjusted, the controller 106 receives another measurement of power from the second sensor and determines whether the measurement of power is within the pre-determined range. In this manner, in the further illustration, the controller 106 continues to modify the resistance of the attenuator AT2 until an amount of power received from the second sensor is within the pre-determined range. In the further illustration, when the amount of power received from the second sensor is within the pre-determined range, the controller 106 stores a first resistance value of the attenuator AT2 for which the amount of power received from the second sensor is within the pre-determined range. Also, in the further illustration, the controller 106 stores a second resistance value of the attenuator AT1 for which the amount of power received from the first sensor is within the pre-determined range. Continuing with the embodiment and the further illustration, during processing of the substrate S, the controller 106 sends the control signal 318B having the first resistance value to the attenuator AT2 and sends the control signal 318A having the second resistance value to the attenuator AT1. As such, during processing of the substrate S, an amount of power of the attenuated signal 322A is within the pre-determined range and an amount of power of the attenuated signal 322B is within the pre-determined range.

FIG. 3B is a diagram of an embodiment of a system 350 to illustrate a change in resistance of an attenuator 352 based on an amount of resistance indicated by a control signal 354. The attenuator 352 is an example of any of the attenuators AT1 through AT5 (FIG. 3A-2). The control signal 354 is an example of any of the control signals 318A through 318E (FIG. 3A-2). For example, when the attenuator 352 is the attenuator AT1, the control signal 354 is an example of the control signal 318A and when the attenuator 352 is the attenuator AT2, the control signal 354 is an example of the control signal 318B.

The attenuator 352 has multiple resistors R1, R2, and R3, each having a different resistance value. The controller 106 is coupled to the attenuator 352 via a switch SW1, such as a transistor or a group of transistors. When the control signal 354 has a first resistance value, the switch SW1 is in a position to couple the switch SW1 to the resistor R1 having the first resistance value. When the control signal 354 has a second resistance value, the switch SW1 is in a position to couple the switch SW1 to the resistor R2 having the second resistance value. Also, when the control signal 354 has a third resistance value, the switch SW1 is in a position to couple the switch SW1 to the resistor R3 having the third resistance value. In this manner, resistance of the attenuator 352 changes with a position of the switch 352.

FIG. 4A is a circuit diagram of an embodiment of a phase shift circuit 400. The phase shift circuit 400 is an example of any of the phase shift circuits PS1 through PS5 (FIG. 3A-2). The phase shift circuit 400 has a top input 410, a bottom input 412, a top output 406, and a bottom output 408.

The phase shift circuit 400 includes a top inductor having an inductance of L/2 and a bottom inductor having the inductance of L/2. Also, the phase shift circuit 400 includes a left capacitor having a capacitance C/2 and a right capacitor having the capacitance of C/2. The top inductor of the phase shift circuit 400 is coupled to the left capacitor and to the right capacitor of the phase shift circuit 400. Also, the bottom inductor of the phase shift circuit 400 is coupled to the left capacitor and to the right capacitor of the phase shift circuit 400. Moreover, the top inductor of the phase shift circuit 400 is coupled to the top input 410 and to the top output 406. Also, the bottom inductor of the phase shift circuit 400 is coupled to the bottom input 412 and to the bottom output 408.

The top input 410 of the phase shift circuit 400 receives a top input signal 414 and the bottom input 412 of the phase shift circuit 400 receives a bottom input signal 416. The phase shift circuit 400 shifts, such as changes, a phase of the top input signal 414 with respect to a phase of the bottom input signal 416 to output a top output signal 418 at the top output 406 and a bottom output signal 420 at the bottom output 408. A phase of the top output signal 418 is shifted by an amount Δa with respect to a phase of the bottom output signal 420. An example of the amount Δa is provided as $$\Delta a = \cos^{-1}\left(1 - \left(\omega^2 LC/2\right)\right) \quad (1)$$

where ω is an angular frequency equal to 2πf, and f is the frequency of operation of the HFPS 102. The phase shift amount Δa is an example of the phase shift Δϕ.

With reference to FIG. 1A-2, an example of the top input signal 414 is the input signal 122B or 122C or 122D or 122E and of the bottom input signal 416 is the input signal 122A or 122B or 122C or 122D. To illustrate, when the bottom input signal 416 is the input signal 122A, the top input signal 414 is the input signal 122B. As another illustration, when the bottom input signal 416 is the input signal 122B, the top input signal 414 is the input signal 122C.

With reference to FIG. 1A-2, an example of the top output signal 418 is the phase-shifted signal 124B or 124C or 124D or 124E and of the bottom output signal 420 is the phase-shifted signal 124A or 124B or 124C or 124D. To illustrate, when the bottom output signal 420 is the phase-shifted signal 124A, the top output signal 418 is the phase-shifted signal 124B. As another illustration, when the bottom output signal 420 is the phase-shifted signal 124B, the top output signal 418 is the phase-shifted signal 124C.

With reference to FIG. 3A-2, an example of the top input signal 414 is the attenuated signal 322B or 322C or 322D or 322E and of the bottom input signal 416 is the attenuated signal 322A or 322B or 322C or 322D. To illustrate, when the bottom input signal 416 is the attenuated signal 322A, the top input signal 414 is the attenuated signal 322B. As another illustration, when the bottom input signal 416 is the attenuated signal 322B, the top input signal 414 is the attenuated signal 322C.

With reference to FIG. 3A-2, an example of the top output signal 418 is the phase-shifted signal 324B or 324C or 324D or 324E and of the bottom output signal 420 is the phase-shifted signal 324A or 324B or 324C or 324D. To illustrate, when the bottom output signal 420 is the phase-shifted signal 324A, the top output signal 418 is the phase-shifted signal 324B. As another illustration, when the bottom output signal 420 is the phase-shifted signal 324B, the top output signal 418 is the phase-shifted signal 324C.

FIG. 4B is a circuit diagram of an embodiment of a phase shift circuit 422. The phase shift circuit 422 is an example of any of the phase shift circuits PS1 through PS5 (FIG. 3A-2). The phase shift circuit 422 has the top input 410, the bottom input 412, the top output 406, and the bottom output 408.

The phase shift circuit 422 includes an inductor having the inductance of L and a resistor having a resistance of R. Also, the inductor of the phase shift circuit 422 is coupled to the top input 410 and to the top output 406 of the phase shift circuit 422. Moreover, the resistor of the phase shift circuit 422 is coupled to the inductor of the phase shift circuit 422, to the top output 406, to the bottom input 412, and to the bottom output 408 of the phase shift circuit 422.

The top input 410 of the phase shift circuit 422 receives the top input signal 414 and the bottom input 412 of the phase shift circuit 422 receives the bottom input signal 416. The phase shift circuit 422 shifts, such as changes, the phase of the top input signal 414 with respect to the phase of the bottom input signal 416 to output the top output signal 418 at the top output 406 and the bottom output signal 420 at the bottom output 408. A phase of the top output signal 418 is shifted by an amount Δb with respect to a phase of the bottom output signal 420. An example of the amount Δb is provided as $$\Delta b = -\text{archtan}(\omega L/R) \tag{2}$$

The phase shift Δb is another example of the phase shift Δϕ.

FIG. 4C is a circuit diagram of an embodiment of a phase shift circuit 424. The phase shift circuit 424 is an example of any of the phase shift circuits PS1 through PS5 (FIG. 3A-2). The phase shift circuit 424 has the top input 410, the bottom input 412, the top output 406, and the bottom output 408.

The phase shift circuit 424 includes the inductor having the inductance of L and the resistor having a resistance of R. Also, the resistor of the phase shift circuit 424 is coupled to the top input 410 and to the top output 406 of the phase shift circuit 424. Moreover, the inductor of the phase shift circuit 424 is coupled to the resistor of the phase shift circuit 424, to the top output 406, to the bottom input 412, and to the bottom output 408 of the phase shift circuit 424.

The top input 410 of the phase shift circuit 424 receives the top input signal 414 and the bottom input 412 of the phase shift circuit 424 receives the bottom input signal 416. The phase shift circuit 424 shifts, such as changes, the phase of the top input signal 414 with respect to the phase of the bottom input signal 416 to output the top output signal 418 at the top output 406 and the bottom output signal 420 at the bottom output 408. A phase of the top output signal 418 is shifted by an amount Δc with respect to a phase of the bottom output signal 420. An example of the amount Δc is provided as $$\Delta C = \text{archtan}(R/\omega L) \tag{3}$$

The phase shift Δc is yet another example of the phase shift Δϕ.

FIG. 4D is a circuit diagram of an embodiment of a phase shift circuit 426. The phase shift circuit 426 is an example of any of the phase shift circuits PS1 through PS5 (FIG. 3A-2). The phase shift circuit 426 has the top input 410, the bottom input 412, the top output 406, and the bottom output 408.

The phase shift circuit 426 includes a capacitor having a capacitance of C and the resistor having a resistance of R. Also, the capacitor of the phase shift circuit 426 is coupled to the top input 410 and to the top output 406 of the phase shift circuit 426. Moreover, the resistor of the phase shift circuit 426 is coupled to the capacitor of the phase shift circuit 426, to the top output 406, to the bottom input 412, and to the bottom output 408 of the phase shift circuit 426.

The top input 410 of the phase shift circuit 426 receives the top input signal 414 and the bottom input 412 of the phase shift circuit 422 receives the bottom input signal 416. The phase shift circuit 426 shifts, such as changes, the phase of the top input signal 414 with respect to the phase of the bottom input signal 416 to output the top output signal 418 at the top output 406 and the bottom output signal 420 at the bottom output 408. A phase of the top output signal 418 is shifted by an amount Δd with respect to a phase of the bottom output signal 420. An example of the amount Δd is provided as $$\Delta d = \text{archtan}(1/\omega RC) \tag{4}$$

The phase shift Δd is another example of the phase shift Δϕ.

FIG. 4E is a circuit diagram of an embodiment of a phase shift circuit 428. The phase shift circuit 428 is an example of any of the phase shift circuits PS1 through PS5 (FIG. 3A-2). The phase shift circuit 428 has the top input 410, the bottom input 412, the top output 406, and the bottom output 408.

The phase shift circuit 428 includes the capacitor having the inductance of C and the resistor having a resistance of R. Also, the resistor of the phase shift circuit 428 is coupled to the top input 410 and to the top output 406 of the phase shift circuit 428. Moreover, the capacitor of the phase shift circuit 428 is coupled to the resistor R, to the top output 406, to the bottom input 412, and to the bottom output 408 of the phase shift circuit 428.

The top input 410 of the phase shift circuit 428 receives the top input signal 414 and the bottom input 412 of the phase shift circuit 428 receives the bottom input signal 416. The phase shift circuit 428 shifts, such as changes, the phase of the top input signal 414 with respect to the phase of the bottom input signal 416 to output the top output signal 418 at the top output 406 and the bottom output signal 420 at the bottom output 408. A phase of the top output signal 418 is shifted by an amount Δe with respect to a phase of the bottom output signal 420. An example of the amount Δe is provided as $$\Delta e = -\text{archtan}(\omega RC) \tag{5}$$

The phase shift Δe is yet another example of the phase shift Δϕ.

Figure 5A:
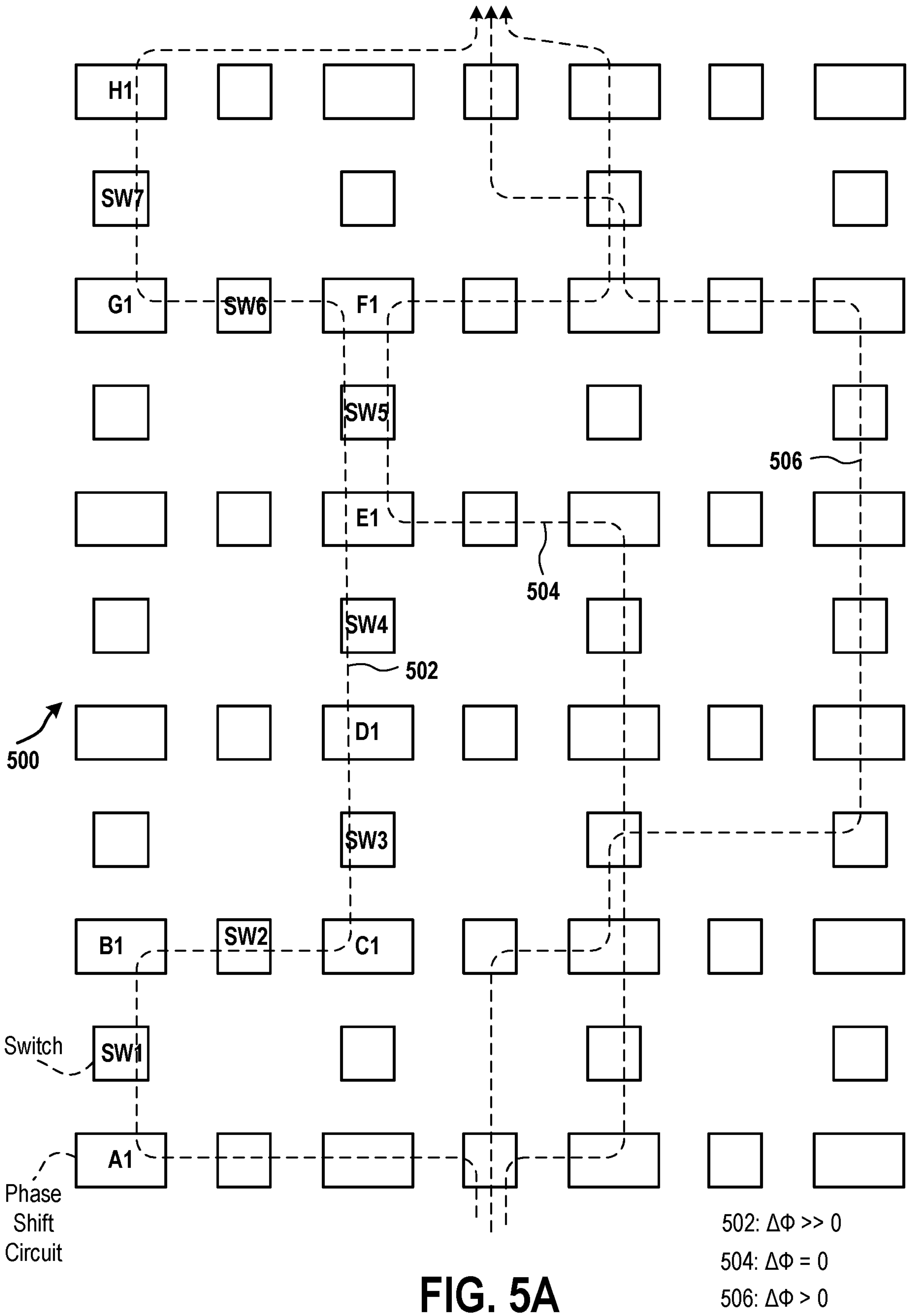
FIG. 5A is a diagram of an embodiment of a system to illustrate a control of multiple phase shift circuits by using switches between two adjacent phase shift circuits.

FIG. 5A is a diagram of an embodiment of a system 500 to illustrate a control of multiple phase shift circuits by using switches between two adjacent phase shift circuits. An example of the system 500 is a Butler™ matrix. In the system 500, a bigger box illustrates a phase shift circuit and a smaller box illustrates a switch. The system 500 includes an array of phase shift circuits and an array of switches.

Any two adjacent phase shift circuits can be coupled to each other via a switch between the phase shift circuits. Three paths 502, 504, and 506 can be formed by coupling multiple phase shift circuits via switches to achieve three different phase shifts. For example, the path 502 is formed by coupling phase shift circuits A1, B1, C1, D1, E1, F1, G1, and H1 with each other. To illustrate, the phase shift circuit A1 is coupled to the phase shift circuit B1 via a switch SW1, the phase shift circuit B1 is coupled to the phase shift circuit C1 via a switch SW2, the phase shift circuit C1 is coupled to the phase shift circuit D1 via a switch SW3, the phase shift circuit D1 is coupled to the phase shift circuit E1 via a switch SW4, the phase shift circuit E1 is coupled to the phase shift circuit F1 via a switch SW5, the phase shift circuit F1 is coupled to the phase shift circuit G1 via a switch SW6, and the phase shift circuit G1 is coupled to the phase shift circuit H1 via a switch SW7 to achieve the phase shift Δϕ to be greater than zero. Similarly, another set of phase shift circuits of the system 500 are coupled to each other via another set of switches of the system 500 to achieve the phase shift Δϕ to be equal to zero. Also, yet another set of phase shift circuits of the system 500 are coupled to each other via another set of switches of the system 500 to achieve the phase shift Δϕ to be greater than zero.

Figure 5B:
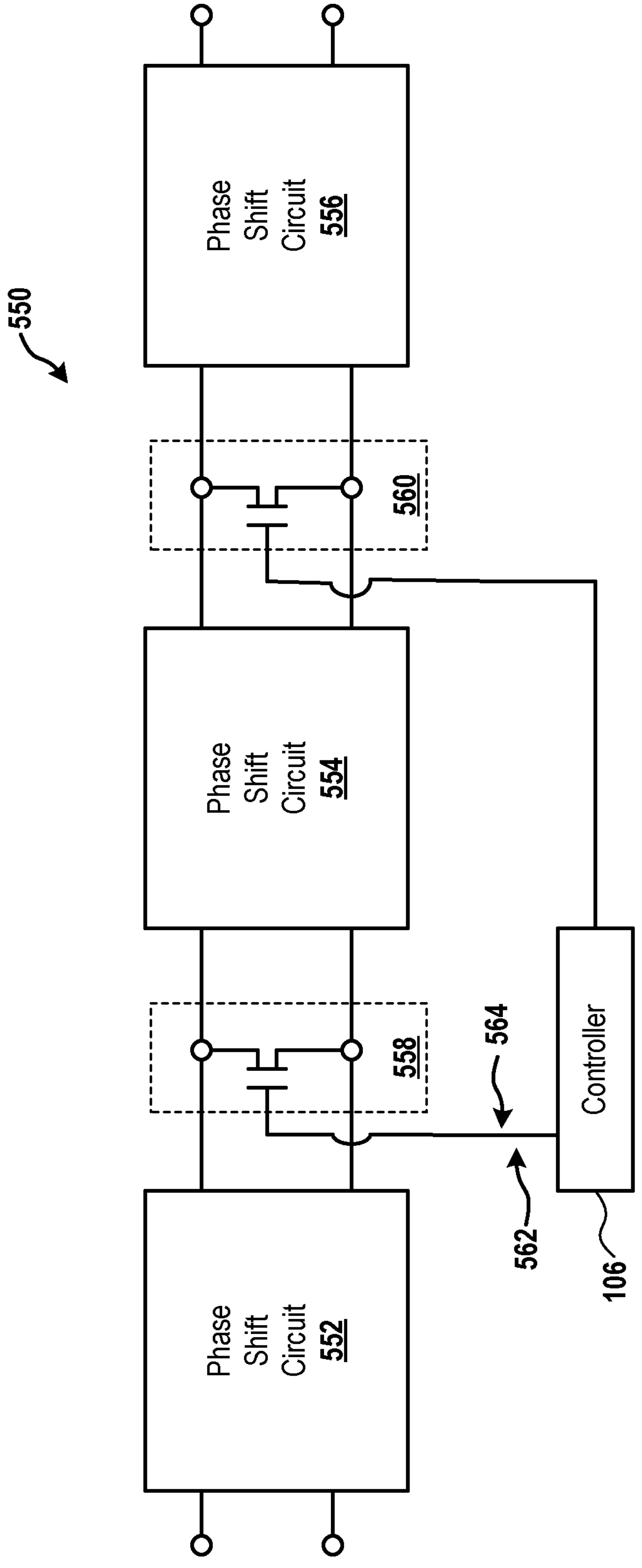
FIG. 5B is a diagram of an embodiment of a system to illustrate a coupling between two adjacent phase shift circuits.

FIG. 5B is a diagram of an embodiment of a system 550 to illustrate a coupling between two adjacent phase shift circuits. The system 500 includes a phase shift circuit 552, a phase shift circuit 554, and a phase shift circuit 556. The phase shift circuit 552 is an example of any of the phase shift circuits, such as any of the phase shift circuits A1 through H1, illustrated in FIG. 5A. The phase shift circuit 554 is an example of any of the phase shift circuits, such as any of the phase shift circuits A1 through H1, illustrated in FIG. 5A. Also, the phase shift circuit 556 is an example of any of the phase shift circuits, such as any of the phase shift circuits A1 through H1, illustrated in FIG. 5A.

The system 550 further includes a switch 558 and another switch 560. As an example, each switch 558 and 560 is a transistor. The switch 558 is an example of any of the switches SW1 through SW7 of the system 500 of FIG. 5A. Similarly, the switch 560 is an example of any of the switches SW1 through SW7 of the system 500.

Any of the phase shift circuits 400, 422, 424, 426, and 428 is an example of the phase shift circuit 552. Any of the phase shift circuits 400, 422, 424, 426, and 428 is an example of the phase shift circuit 554. Also, any of the phase shift circuits 400, 422, 424, 426, and 428 is an example of the phase shift circuit 556.

The phase shift circuit 554 is adjacent to the phase shift circuit 552. For example, there is no phase shift circuit between the phase shift circuits 552 and 554, and there is the switch 558 between the phase shift circuits 552 and 554. Similarly, the phase shift circuit 556 is adjacent to the phase shift circuit 554.

The controller 106 is coupled to the switch 558 and the switch 560. The controller 106 sends a connect signal 562 to the switch 558 to turn on the switch 558. When the switch 558 is turned on, a top output signal is transferred from the phase shift circuit 552 to the phase shift circuit 554 and a bottom output signal is transferred from the phase shift circuit 552 to the phase shift circuit 554 to couple the phase shift circuit 552 with the phase shift circuit 554. On the other hand, the controller 106 sends a disconnect signal 564 to the switch 558 to turn off the switch 558. When the switch 558 is turned off, the top output signal is not transferred from the phase shift circuit 552 to the phase shift circuit 554 and the bottom output signal is not transferred from the phase shift circuit 552 to the phase shift circuit 554 to decouple the phase shift circuit 554 from the phase shift circuit 552. Similarly, the controller 106 sends a connect signal to the switch 560 to couple the phase shift circuit 554 with the phase shift circuit 556 and sends a disconnect signal to the switch 560 to decouple the phase shift circuit 556 from the phase shift circuit 556.

FIG. 6A is a diagram of an embodiment of a system 600 to illustrate generation of a main beam MB3 and another main beam MB4. The system 600 includes the CCP chamber. The CCP chamber further includes a C-shroud 602, an upper electrode (U.E.) 604, an upper electrode extension (U.E.E.) 606, the substrate support 206, and the edge ring 104.

The C-shroud 602 includes slots 608A, 608B, and 608C that are used to control pressure within the CCP chamber. For example, the slots 608A, 608B, and 608C are open to increase gas flow through the slots to decrease gas pressure in a gap 610 of the CCP chamber. As an example, the gas pressure is applied by a flow of the one or more process gases. The gap 610 is formed between the substrate support 206 and the upper electrode 604. The slots 608A, 608B, and 608C are closed to decrease the flow to increase gas pressure in the gap. A bottom extension 630 of the C-shroud 602 has the slots 608A, 608B, and 608C for exit of the plasma formed within the gap 610, or remnants of the plasma, or the one or more process gases.

As an example, the upper electrode 604 is made from a metal such as aluminum or an alloy of aluminum. Also, as an example, the upper electrode extension 606 is fabricated from a semiconductor or a conductor. Furthermore, as an example, the C-shroud 602 is fabricated from a semiconductor or a conductor.

The upper electrode extension 606 surrounds the upper electrode 604. For example, the upper electrode extension 606 is an annular ring that surrounds the upper electrode 604. The C-shroud 602 has a left portion 602A and a right portion 602B. A cross-section of the left portion 602A represents a C-shape and a cross-section of the right portion 602B represents a mirror image of the C-shape. Also, the bottom extension 630 of the C-shroud 602 surrounds the edge ring 104. The gap 610 is surrounded or enclosed by the C-shroud 602, the upper electrode extension 660, the upper electrode 604, the edge ring 104, and the substrate support 206.

The system 600 further includes an attenuator array 612, a phase shifter 614, and an antenna array 616. An example of the attenuator array 612 is the attenuator array 302 (FIG. 3A-1). To illustrate, the attenuator array 612 is similar in structure and function as the attenuator array 302. An example of the phase shifter 614 is the phase shifter 108 (FIG. 1A-i). To illustrate, the phase shifter 614 is similar in structure and function as of the phase shifter 108. Also, an example of the antenna array 616 is the antenna array 110 (FIG. 1A-i). To illustrate, the antenna array 616 is similar in structure and function as the antenna array 110.

Furthermore, the system 600 includes an attenuator array 618, a phase shifter 620, and an antenna array 622. An example of the attenuator array 618 is the attenuator array 302 (FIG. 3A-1). To illustrate, the attenuator array 618 is similar in structure and function as the attenuator array 302. An example of the phase shifter 620 is the phase shifter 108 (FIG. 1A-i). To illustrate, the phase shifter 620 is similar in structure and function as of the phase shifter 108. Also, an example of the antenna array 622 is the antenna array 110 (FIG. 1A-i). To illustrate, the antenna array 622 is similar in structure and function as the antenna array 110.

The system 600 includes an HFPS 624. An example of the HFPS 624 is the HFPS 102 (FIG. 1A-i). To illustrate, the HFPS 624 is similar in structure and function to that of the HFPS 102. To further illustrate, the HFPS 624 is a GHz power source that has a frequency of operation in a GHz range, examples of which are provided above with respect to the HFPS 102.

The HPFS 624 is coupled via a connection 626 and a connection point CP2 to the attenuator array 612 and is coupled via another connection 628 and a connection point CP3 to the attenuator array 618. For example, the HFPS 624 is coupled to the attenuator array 612 or the attenuator array 618 in the same manner in which the HFPS 102 is coupled to the attenuator array 302 via the connection 128 and connection point CP1 (FIG. 3A-2).

The attenuator array 612 is coupled to the phase shifter 614, which is coupled to the antenna array 616. For example, the attenuator array 612 is coupled to the phase shifter 614 in the same manner in which the attenuator array 302 is coupled to the phase shifter 108. Further in the example, the phase shifter 614 is coupled to the antenna array 616 in the same manner in which the phase shifter 108 is coupled to the antenna array 110.

The bottom extension 630 has a left bottom extension portion 630A and a right bottom extension portion 630B. The C-shroud 602 further includes a body 632 and a top extension 634. The body 632 includes a left body portion 632A and a right body portion 632B. Also, the top extension 634 includes a left top extension portion 634A and a right top extension portion 634B.

The left portion 602A of the C-shroud 602 includes the left bottom extension portion 630A, the left body portion 632A, and the left top extension portion 634A. Similarly, the right portion 602B of the C-shroud 602 includes the right bottom extension portion 630B, the right body portion 632B, and the right top extension portion 634B.

The left bottom extension portion 630A and the left top extension portion 634A extend toward the right portion 602B from the left body portion 632A. Similarly, the right bottom extension portion 630B and the right top extension portion 634B extend toward the left portion 602A from the right body portion 632B.

The antenna array 616 has multiple antenna elements, which are coupled to the left body portion 602A of the C-shroud 602. For example, the antenna elements of the antenna array 616 are attached to an outer surface 636 of the left body portion 602A in the same manner in which the antenna array 108 is attached to the edge ring 104. The outer surface 636 faces in a direction away from the gap 610. The outer surface 636 is located in a direction opposite to that of an inner surface 638 of the left body portion 632A. For example, the outer surface 636 faces in the direction away from the right portion 602B. The inner surface 638 faces the gap 610 and the right portion 602B.

Similarly, the attenuator array 618 is coupled to the phase shifter 620, which is coupled to the antenna array 622. For example, the attenuator array 618 is coupled to the phase shifter 620 in the same manner in which the attenuator array 302 is coupled to the phase shifter 108. Further in the example, the phase shifter 620 is coupled to the antenna array 622 in the same manner in which the phase shifter 108 is coupled to the antenna array 110.

The antenna array 622 has multiple antenna elements, which are coupled to the right portion 602B of the C-shroud 602. For example, the antenna elements of the antenna array 622 are attached to an outer surface 640 of the right body portion 632B in the same manner in which the antenna array 108 is attached to the edge ring 104. The outer surface 640 faces in a direction away from the gap 610. The outer surface 640 is located in a direction opposite to that of an inner surface 642 of the right body portion 632B. For example, the outer surface 640 faces in the direction away from the left portion 602A. The inner surface 642 faces the gap 610 and the left portion 602A.

Also, the controller 106 is coupled to the attenuator array 612, the phase shifter 614, the attenuator array 618, and the phase shifter 620. For example, the controller 106 is coupled to the attenuator array 612 in the same manner in which the controller 106 is coupled to the attenuator array 302. In the example, the controller 106 is coupled to the attenuator array 618 in the same manner in which the controller 106 is coupled to the attenuator array 302. Further, in the example, the controller 106 is coupled to the phase shifter 614 in the same manner in which the controller 106 is coupled to the phase shifter 108. Also, in the example, the controller 106 is coupled to the phase shifter 620 in the same manner in which the controller 106 is coupled to the phase shifter 108.

The substrate S is placed on the top surface 216 of the substrate support 206 for processing the substrate S. Examples of processing the substrate S include depositing one or more materials on the substrate S, etching the substrate S, and cleaning the substrate S. After the substrate S is placed within the CCP chamber, an operation of the HFPS 624, the attenuator array 612, the phase shifter 614, and the antenna array 616 is the same as the operation, described above, of the HFPS 102, the attenuator array 302, the phase shifter 108, and the antenna array 110. The HFPS 624, the attenuator array 612, the phase shifter 614, and the antenna array 616 operate to generate a main beam MB3, which forms an angle of $-\theta 1$ with respect to a horizontal axis 644. For example, the HFPS 624 generates an RF signal 646 having a power level and a frequency level. In the example, the frequency and power levels of the RF signal 646 are received from the controller 106 by the HFPS 624. Further, in the example, attenuator array 612 receives the RF signal 646 and outputs multiple attenuated signals based on the RF signal 646 in the same manner in which the attenuator array 302 outputs the attenuated signals 322A-322E based on the RF signal 120 (FIG. 3A-1). Also, in the example, the phase shifter 614 receives the attenuated signals from the attenuator array 612 and outputs multiple phase-shifted signals based on the attenuated signals in the same manner in which the phase shifter 108 receives the attenuated signals 322A-322E from the attenuator array 302 and outputs the phase-shifted signals based 324A-324E on the attenuated signals 322A-322E. Further, in the example, the antenna elements of the antenna array 616 receives the phase-shifted signals from the phase shifter 614 and outputs RF waveforms via the left body portion 632A in the same manner in which the antenna elements AE1 through AE5 receives the phase-shifted signals 324A-324E from the phase shifter 108 and outputs the first through fifth RF waveforms via the edge ring 104. In the example, the left body portion 632A combines, such as superimposes, RF power of the RF waveforms output via the left body portion 632A to generate the main beam MB3 in a horizontal direction towards the gap 610 to strike or maintain plasma within the gap 610. The main beam MB3 is a lobe. Also, in the example, the main beam MB3 is directed at the angle $-\theta 1$ with respect to the horizontal axis 644, which passes through a centroid of an antenna element of the antenna array 616. The main beam MB3 is directed towards a left edge of the substrate S to process the left edge of the substrate S.

Similarly, operation of the HFPS 624, the attenuator array 618, the phase shifter 620, and the antenna array 622 is the same as the operation, described above, of the HFPS 102, the attenuator array 302, the phase shifter 108, and the antenna array 110. The HFPS 624, the attenuator array 618, the phase shifter 620, and the antenna array 622 operate to generate a main beam MB4, which forms an angle of $-\theta 2$ with respect to the horizontal axis 644. For example, the HFPS 624 generates an RF signal 648 having a power level and a frequency level. In the example, the frequency and power levels of the RF signal 648 are received from the controller 106 by the HFPS 624. Further, in the example, attenuator array 618 receives the RF signal 648 and outputs multiple attenuated signals based on the RF signal 648 in the same manner in which the attenuator array 302 outputs the attenuated signals 322A-322E based on the RF signal 120 (FIG. 3A-1). Also, in the example, the phase shifter 620 receives the attenuated signals from the attenuator array 618 and outputs multiple phase-shifted signals based on the attenuated signals in the same manner in which the phase shifter 108 receives the attenuated signals 322A-322E from the attenuator array 302 and outputs the phase-shifted signals based 324A-324E on the attenuated signals 322A-322E. Further, in the example, the antenna elements of the antenna array 622 receives the phase-shifted signals from the phase shifter 620 and outputs RF waveforms via the right body portion 632B in the same manner in which the antenna elements AE1 through AE5 receives the phase-shifted signals 324A-324E from the phase shifter 108 and outputs the first through fifth RF waveforms via the edge ring 104. In the example, the right body portion 632B combines, such as superimposes, RF power of the RF waveforms output via the right body portion 632B to generate the main beam MB4 in a horizontal direction towards the gap 610 to strike or maintain plasma in the gap 610. The main beam MB4 is a lobe. Also, in the example, the main beam MB4 is directed at the angle −θ2 with respect to the horizontal axis 644, which passes through a centroid of an antenna element of the antenna array 622. The main beam MB4 is directed towards a right edge of the substrate S to process the right edge of the substrate S.

In one embodiment, the system 600 lacks the attenuator array 618 or the attenuator array 612 or both the attenuator arrays 612 and 618. As an example, the HFPS 624 is coupled via the connection 628 to the phase shifter 620 without being coupled to the attenuator array 618. As another example, the HFPS 624 is coupled via the connection 626 to the phase shifter 614 without being coupled to the attenuator array 612.

In an embodiment, the upper electrode 604 is coupled to a reference potential, such as a ground potential.

In one embodiment, the upper electrode 604 is coupled to one or more RF generators via a match.

FIG. 6B is a diagram of an embodiment of a system 660 to illustrate use of the antenna arrays 616 and 622 with a pinnacle 652 of the ICP chamber. An example of the pinnacle 652 is a liner. The system 660 includes the ICP chamber. The ICP chamber further includes the pinnacle 652, a dielectric window 662, the substrate support 206, a plasma confinement ring 662, the edge ring 104, and multiple RF coils 670 and 672. As an example, the pinnacle 652 is fabricated from a conductor or a semi-conductor, and is coupled to the reference potential. Further, as an example, the plasma confinement ring 662 is fabricated from a conductor or a semi-conductor.

The plasma confinement ring 662 includes openings 666A, 666B, and 666C that are used to control pressure within a gap 668 formed within the ICP chamber. The gap 668 is formed between the substrate support 206 and the dielectric window 662. The openings 666A, 666B, and 666C are for exit of the plasma formed within the gap 668, or remnants of the plasma, or the one or more process gases from the ICP chamber.

The pinnacle 652 supports the dielectric window 662. The RF coils 670 and 672 are located on top of the dielectric window 662. The plasma confinement ring 662 is located below and adjacent to the pinnacle 652. Also, a diameter of the plasma confinement ring 662 is greater than the outer diameter of the edge ring 104. The plasma confinement ring 662 is located at a horizontal level below a horizontal level of the edge ring 104. A horizontal level, as used herein, is a level that is parallel to the x-axis. The gap 668 is surrounded by the pinnacle 652, the dielectric window 662, the plasma confinement ring 664, the edge ring 104, and the substrate support 206.

The system 660 further includes the attenuator array 612, the phase shifter 614, and the antenna array 616. Furthermore, the system 660 includes the attenuator array 618, the phase shifter 620, and the antenna array 622.

The antenna array 616 has the antenna elements, which are coupled to the pinnacle 652, which has a left body portion 652A and a right body portion 652B. The left body portion 652A faces the right body portion 652B via the gap 668.

The antenna elements of the antenna array 616 are coupled to the left body portion 652A of the pinnacle 652. For example, the antenna elements of the antenna array 616 are attached to an outer surface 674 of the left body portion 652A in the same manner in which the antenna array 108 is attached to the edge ring 104. The outer surface 674 faces in a direction away from the gap 668. The outer surface 674 is located in a direction opposite to that of an inner surface 676 of the left body portion 652A. For example, the outer surface 676 faces in the direction away from the right body portion 652B. The inner surface 676 faces the gap 610 and the right body portion 652B.

Similarly, the antenna elements of the antenna array 622 are coupled to the right body portion 652B of the pinnacle 652. For example, the antenna elements of the antenna array 622 are attached to an outer surface 678 of the right body portion 652B in the same manner in which the antenna array 108 is attached to the edge ring 104. The outer surface 678 faces in a direction away from the gap 668. The outer surface 678 is located in a direction opposite to that of an inner surface 680 of the right body portion 652B. For example, the outer surface 678 faces in the direction away from the left body portion 652A. The inner surface 680 faces the gap 668 and the left body portion 652A.

After the substrate S is placed on the top surface 216 of the substrate support 206 within the ICP chamber, an operation of the HFPS 624, the attenuator array 612, the phase shifter 614, and the antenna array 616 is the same as the operation, described above with reference to FIG. 6A, of the HFPS 102, the attenuator array 302 (FIG. 3A-2), the phase shifter 108, and the antenna array 110 to generate the main beam MB3, which forms the angle of −θ1 with respect to the horizontal axis 644. For example, the antenna elements of the antenna array 616 receive the phase-shifted signals from the phase shifter 614 and outputs RF waveforms via the left body portion 652A in the same manner in which the antenna elements AE1 through AE5 receive the phase-shifted signals 324A-324E from the phase shifter 108 and outputs the first through fifth RF waveforms via the edge ring 104. In the example, the left body portion 652A combines, such as superimposes, RF power of the RF waveforms output via the left body portion 632A to generate the main beam MB3 in the horizontal direction towards the plasma formed in the gap 668.

Similarly, an operation of the HFPS 624, the attenuator array 618, the phase shifter 620, and the antenna array 622 is the same as the operation, described above with reference to FIG. 6A, of the HFPS 102, the attenuator array 302, the phase shifter 108, and the antenna array 110 to generate the main beam MB4, which forms the angle of −θ2 with respect to the horizontal axis 644. For example, the antenna elements of the antenna array 622 receives the phase-shifted signals from the phase shifter 620 and outputs RF waveforms via the right body portion 652B in the same manner in which the antenna elements AE1 through AE5 receive the phase-shifted signals 324A-324E from the phase shifter 108 and outputs the first through fifth RF waveforms via the edge ring 104. In the example, the right body portion 652B combines, such as superimposes, RF power of the RF waveforms output via the right body portion 652B to generate the main beam MB4 in a horizontal direction towards the plasma formed in the gap 668.

In one embodiment, the system 660 lacks the attenuator array 618 or the attenuator array 612 or both the attenuator arrays 612 and 618. As an example, the HFPS 624 is coupled via the connection 628 to the phase shifter 620 without being coupled to the attenuator array 618. As another example, the HFPS 624 is coupled via the connection 626 to the phase shifter 614 without being coupled to the attenuator array 612.

In an embodiment, the pinnacle 652 has a tapered structure that is tapered in a direction opposite to that of the y-axis.

FIG. 7A is a diagram of an embodiment of a system 700 to illustrate turning on and off of the main beam MB2, and simultaneous turning on and off of the main beam MB3 or of the main beam MB4 in the CCP chamber. The system 700 includes the CCP chamber. The antenna array 110 is coupled to the edge ring 110, the antenna array 616 is coupled to the left portion 602A of the C-shroud 602, and the antenna array 622 is coupled to the right portion 602B of the C-shroud 602.

To turn on the main beam MB2, the controller 106 sends a turn on signal to the HFPS 102 (FIG. 1A-1). In response to receiving the turn on signal, the HPFS 102 generates the RF signal 120. When the RF signal 120 is generated, the main beam MB2 is generated. On the other hand, to turn off the main beam MB2, the controller 106 sends a turn off signal to the HFPS 102. In response to receiving the turn off signal, the HPFS 102 does not generate the RF signal 120. When the RF signal 120 is not generated, the main beam MB2 is not output from the edge ring 104.

Similarly, to turn on the main beam MB3, the controller 106 sends a turn on signal to the HFPS 624 (FIG. 6A). In response to receiving the turn on signal, the HPFS 624 generates the RF signal 646 (FIG. 6A). When the RF signal 646 is generated, the main beam MB3 is generated. On the other hand, to turn off the main beam MB3, the controller 106 sends a turn off signal to the HFPS 624. In response to receiving the turn off signal, the HPFS 624 does not generate the RF signal 646. When the RF signal 646 is not generated, the main beam MB3 is not output from the left portion 602A of the C-shroud 602.

Also, to turn on the main beam MB4, the controller 106 sends a turn on signal to the HFPS 624 (FIG. 6A). In response to receiving the turn on signal, the HPFS 624 generates the RF signal 648 (FIG. 6A). When the RF signal 648 is generated, the main beam MB4 is generated. On the other hand, to turn off the main beam MB4, the controller 106 sends a turn off signal to the HFPS 624. In response to receiving the turn off signal, the HPFS 624 does not generate the RF signal 648. When the RF signal 648 is not generated, the main beam MB4 is not output from the right portion 602B of the C-shroud 602.

FIG. 7B is a diagram of an embodiment of a system 750 to illustrate turning on and off of the main beam MB2, and simultaneous turning on and off of the main beam MB3 or of the main beam MB4 in the ICP chamber. The system 750 includes the ICP chamber. The antenna array 110 is coupled to the edge ring 110, the antenna array 616 is coupled to the left body portion 652A of the pinnacle 652, and the antenna array 622 is coupled to the right body portion 652B of the pinnacle 652.

The turning on and off the main beam MB2 is the same as that described above with reference to FIG. 7A. Also, the turning on and off the main beam MB3 is the same as that described above with reference to FIG. 7A. When the RF signal 646 is generated, the main beam MB3 is output from the left body portion 652A of the pinnacle 652. On the other hand, when the RF signal 646 is not generated, the main beam MB3 is not output from the left body portion 652A of the pinnacle 652.

Furthermore, the turning on and off the main beam MB4 is the same as that described above with reference to FIG. 7A. When the RF signal 648 is generated, the main beam MB4 is output from the right body portion 652B of the pinnacle 652. On the other hand, when the RF signal 648 is not generated, the main beam MB4 is not output from the right body portion 652B of the pinnacle 652.

It should be noted that although FIGS. 7A and 7B are described with reference to the main beam MB2, the embodiment for turning on and off the main beam MB2 described above with reference to FIGS. 7A and 7B applies equally to turning on and off the main beam MB1. For example, in response to receiving the turn on signal, the HPFS 102 generates the RF signal 120. When the RF signal 120 is generated, the main beam MB1 is generated. On the other hand, to turn off the main beam MIB1, the controller 106 sends the turn off signal to the HFPS 102. In response to receiving the turn off signal, the HPFS 102 does not generate the RF signal 120. When the RF signal 120 is not generated, the main beam MB1 is not output from the edge ring 104.

FIG. 8A is a diagram of an embodiment of the edge ring 104 to illustrate that the antenna elements AE1 through AE5 are embedded within the edge ring 104. Multiple slots SL1, SL2, SL3, SL4, and SL5 are formed within the edge ring 104. Each slot SL1 through SL5 extends from the bottom surface BS1 into the edge ring 104 towards the top surface TS1. For example, a horizontal level HL1 of the slot SL1 is higher than a horizontal level HL2 of the bottom surface BS1. Each horizontal level HL1 and HL2 extends along the x-axis. As another example, each slot SL1 through SL5 extends into a body of the edge ring 104 to have a height within the edge ring 104. The body of the edge ring 104 is between the bottom surface BS1 and the top surface TS1. The height is measured from the bottom surface BS1.

Each antenna element AE1 through AE5 is placed within a respective one of the slots SL1 through SL5. For example, the antenna element AE1 is placed to extend within the slot SL1, the antenna element AE2 is placed to extend within the slot SL2, the antenna element AE3 is placed to extend within the slot SL3, the antenna element AE4 is placed to extend within the slot SL4, and the antenna element AE5 is placed to extend within the slot SL5. As an example, a portion of each antenna element AE1 through AE5 does not extend outside a respective one of the slots SL1 through SL5. For example, a bottom surface of the antenna element AE1 is at the horizontal level HL2 or is above the horizontal level HL2. As another example, a minor portion of each antenna element AE1 through AE5 extends outside a respective one of the slots SL1 through SL5. For example, less than half of the antenna element AE1 extends from the horizontal level HL2 to a horizontal level below the horizontal level HL2. It should be noted when portions of the antenna elements AE1 through AE5 extends from into the slots SL1 through SL5, chances of any side lobes that may be formed with the main lobe MB1 or MB2 for extending to the substrate support 206 are reduced. As such, chances of any damage to the substrate support 206 from the side lobes are reduced.

Figure 8B:
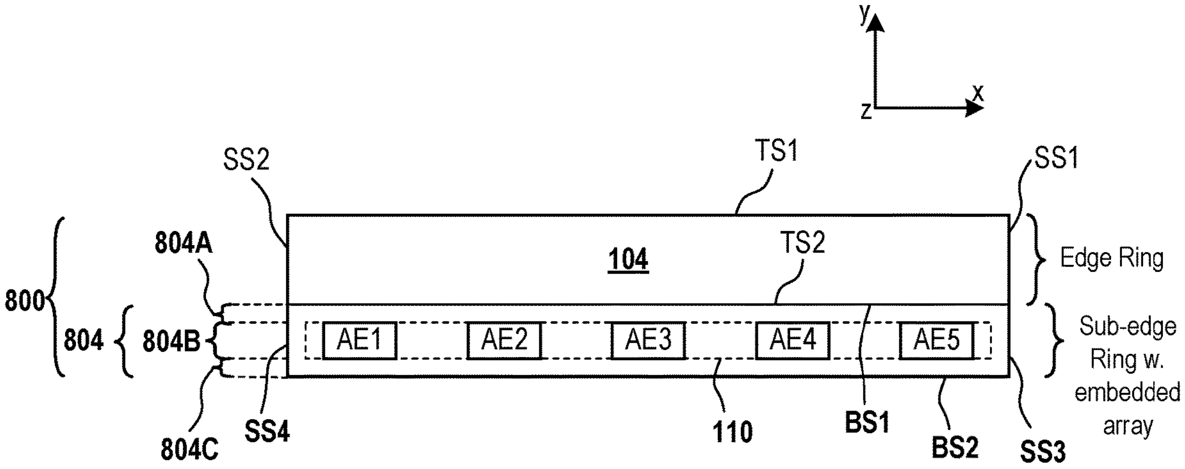
FIG. 8B is a diagram of an embodiment of an edge ring that includes another edge ring and a sub-edge ring having an antenna array.

FIG. 8B is a diagram of an embodiment of an edge ring 800 that includes the edge ring 104 and a sub-edge ring 804 having the antenna array 110 embedded therein. The sub-edge ring 804 has a side surface SS3, which is an outer side surface. The sub-edge ring 804 also a side surface SS4, which is an inner side surface. A diameter of the side surface SS3 is greater than a diameter of the side surface SS4. The sub-edge ring 804 has the antenna array 110 embedded within it. As an example, the sub-edge ring 804 is annular is shape and extends around the substrate support 206. To illustrate, the diameter of the side surface SS3 is greater than the diameter of the substrate support 206.

The sub-edge ring 804 has a top surface TS2 and a bottom surface BS2. The sub-edge ring 804 extends from the side surface SS3 to the side surface SS4 and from the top surface TS2 to the bottom surface BS2. The top surface TS2 is adjacent to the bottom surface BS1 of the edge ring 104. The bottom surface BS2 faces in a direction away from the plasma. For example, the bottom surface BS2 is located adjacent to the support ring, which is located below the sub-edge ring 804.

The sub-edge ring 804 is fabricated from the same material used to fabricate the edge ring 104. The sub-edge ring 804 is attached to the edge ring 104. For example, the top surface TS2 of the sub-edge ring 804 is fixed to the bottom surface BS1 of the edge ring 104 via an attachment mechanism, such as screws, or glue, or soldering, a combination thereof.

Also, the sub-edge ring 804 is aligned in the vertical direction, along the y-axis, with the edge ring 104. For example, the side surface SS3 is aligned vertically with the side surface SS1 and the side surface SS4 is aligned vertically with the side surface SS2. To illustrate, a width of the sub-edge ring 804 is equal to a width of the edge ring 104. In the illustration, the width of the sub-edge ring 804 is a horizontal distance between the side surfaces SS3 and SS4 and a width of the edge ring 104 is a horizontal distance between the side surfaces SS1 and SS2. In the illustration, a horizontal distance is a distance along the x-axis.

The antenna array 110 is embedded within the sub-edge ring 804 instead of being located within the edge ring 104. For example, the sub-edge ring 804 has a first portion 804A, a second portion 804B, and a third portion 804C. In the example, the second portion 804B is below the first portion 804A and above the third portion 804C. Further, in the example, the second portion 804B is located between the first portion 804A and the third portion 804C. In the example, the antenna elements AE1 through AE5 are situated within the second portion 804B. To illustrate, no portion of the antenna elements AE1 through AE5 is located within the first portion 804A or the third portion 804C. To further illustrate, the third portion 804C is fabricated first. In the further illustration, the second portion 804B is overlaid on top of the third portion 804C. In the further illustration, five slots are formed within the second portion 804B and each of the five slots fits a respective one of the antenna elements AE1 through AE5. In the further illustration, the second portion 804B is overlaid with the first portion 804A to fabricate the sub-edge ring 804.

In operation, the antenna elements AE1 through AE5 receive the phase-shifted signals 124A, 124B, 124C, 124D, and 124E (FIG. 1A-2). In response to receiving a respective one of the phase-shifted signals 124A through 124E, a respective one of the antenna elements AE1 through AE5 outputs RF waveforms via the first portion 804A of the sub-edge ring 804 and via the edge ring 104. For example, upon receiving the phase-shifted signal 124A, the antenna element AE1 outputs the first RF waveform towards the first portion 804A of the sub-edge ring 804 and the edge ring 104. Also, in the example, upon receiving the phase-shifted signal 124B, the antenna element AE2 outputs the second RF waveform towards the first portion 804A of the sub-edge ring 804 and the edge ring 104 and upon receiving the phase-shifted signal 124C, the antenna element AE3 outputs the third RF waveform towards the first portion 804A of the sub-edge ring 804 and the edge ring 104. In the example, upon receiving the phase-shifted signal 124D, the antenna element AE4 outputs the fourth RF waveform towards the first portion 804A of the sub-edge ring 804 and the edge ring 104 and upon receiving the phase-shifted signal 124E, the antenna element AE5 outputs the fifth RF waveform towards the first portion 804A of the sub-edge ring 804 and the edge ring 104. The first portion 804A of the sub-edge ring 804 and the edge ring 104 combine RF power of the first through fifth RF waveforms to output a main beam, such as the main beam MB1 (FIG. 1A-1) or MB2 (FIG. 1C), in the vertical direction towards the plasma formed in the plasma chamber.

In an embodiment, the antenna elements AE1 through AE5 are fitted in slots formed in the third portion 804C. For example, portions of the antenna elements AE1 through AE5 extend below a horizontal level of the bottom surface BS2. To illustrate, the portions of the antenna elements AE1 through AE5 extend from the third portion 804C to the horizontal level below the horizontal level of the bottom surface BS2. As another example, portions of the antenna elements AE1 through AE5 extend above the horizontal level of the bottom surface BS2. As yet another example, a horizontal level of portions of the antenna elements AE1 through AE5 extend is the same as the horizontal level of the bottom surface BS2.

In one embodiment, the sub-edge ring 804 has a greater width compared to the width of the edge ring 104.

In an embodiment, the edge ring 104 has a greater width compared to the width of the sub-edge ring 804.

Figures 2, 3A:
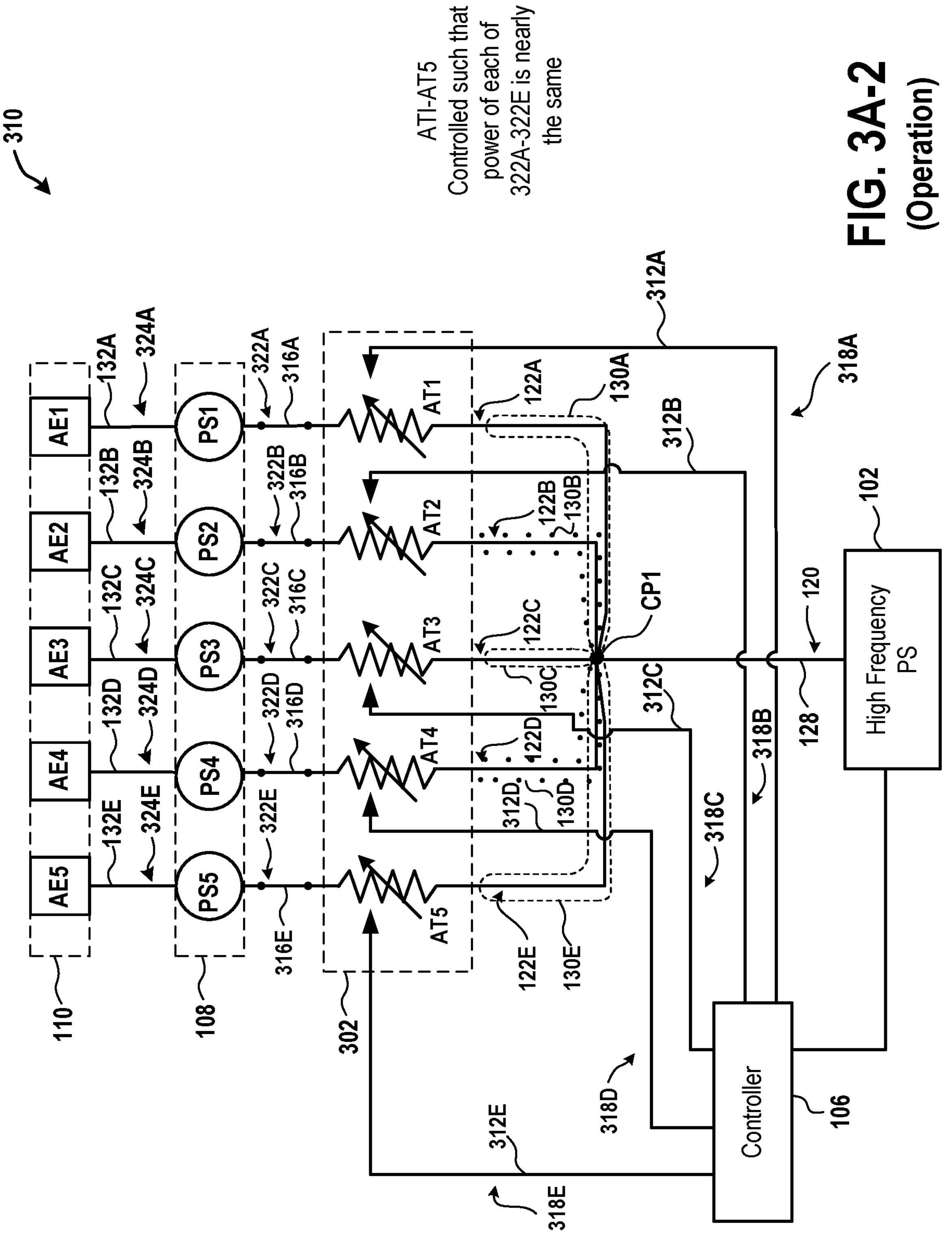

In an embodiment, in operation, the antenna elements AE1 through AE5 receive the phase-shifted signals 324A, 324B, 324C, 324D, and 124E (FIG. 3). In response to receiving a respective one of the phase-shifted signals 324A through 324E, a respective one of the antenna elements AE1 through AE5 outputs RF waveforms via the first portion 804A of the sub-edge ring 804 and via the edge ring 104. For example, upon receiving the phase-shifted signal 324A, the antenna element AE1 outputs the first RF waveform towards the first portion 804A of the sub-edge ring 804 and towards the edge ring 104. Also, in the example, upon receiving the phase-shifted signal 324B, the antenna element AE2 outputs the second RF waveform towards the first portion 804A of the sub-edge ring 804 and towards the edge ring 104 and upon receiving the phase-shifted signal 324C, the antenna element AE3 outputs the third RF waveform towards the first portion 804A of the sub-edge ring 804 and towards the edge ring 104. In the example, upon receiving the phase-shifted signal 324D, the antenna element AE4 outputs the fourth RF waveform towards the first portion 804A of the sub-edge ring 804 and towards the edge ring 104 and upon receiving the phase-shifted signal 324E, the antenna element AE5 outputs the fifth RF waveform towards the first portion 804A of the sub-edge ring 804 and towards the edge ring 104. The first portion 804A of the sub-edge ring 804 and the edge ring 104 combine RF power of the first through fifth RF waveforms to output a main beam, such as the main beam MB1 (FIG. 1A-1) or MB2 (FIG. 1C), in the vertical direction towards a gap in the plasma chamber.

In an embodiment, in operation, the antenna elements AE1 through AE5 receive the phase-shifted signals 324A, 324B, 324C, 324D, and 324E (FIG. 3B). In response to receiving a respective one of the phase-shifted signals 324A through 324E, a respective one of the antenna elements AE1 through AE5 outputs the first through fifth RF waveforms towards the first portion 804A of the sub-edge ring 804 and towards the edge ring 104. The first portion 804A and the edge ring 104 combines RF power of the first through fifth RF waveforms to output a main beam, such as the main beam MB1 (FIG. 1A-1) or MB2 (FIG. 1C), in the vertical direction towards a gap in the plasma chamber.

Figure 8C:
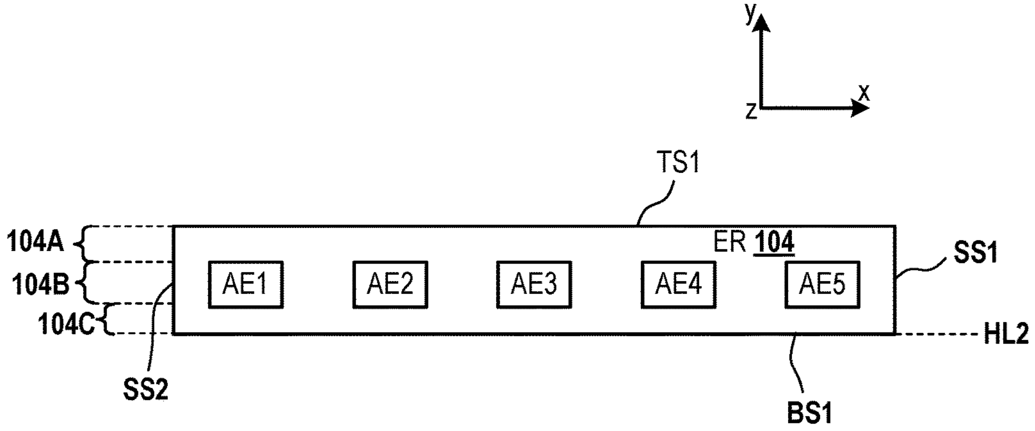
FIG. 8C is a diagram of an embodiment of an edge ring to illustrate an antenna array as being embedded within the edge ring.

FIG. 8C is a diagram of an embodiment of the edge ring 104 to illustrate the antenna array 110 as being embedded within the edge ring 104. The edge ring 104 has a first portion 104A, a second portion 104B, and a third portion 104C. In the example, the second portion 104B is below the first portion 104A and above the third portion 104C. Further, in the example, the second portion 104B is located between the first portion 104A and the third portion 104C. In the example, the antenna elements AE1 through AE5 are situated within the second portion 104B. To illustrate, no portion of the antenna elements AE1 through AE5 is located within the first portion 104A or the third portion 104C. To further illustrate, the third portion 104C is fabricated first. In the further illustration, the second portion 104B is overlaid on top of the third portion 104C. In the further illustration, the second portion 104B includes five slots and each slot fits a respective one of the antenna elements AE1 through AE5. In the further illustration, the second portion 104B is overlaid with the first portion 104A to fabricate the edge ring 104.

In operation, the antenna elements AE1 through AE5 receive the phase-shifted signals 124A, 124B, 124C, 124D, and 124E (FIG. 1A-2). In response to receiving a respective one of the phase-shifted signals 124A through 124E, a respective one of the antenna elements AE1 through AE5 outputs RF waveforms via the first portion 104A of the edge ring 104. For example, upon receiving the phase-shifted signal 124A, the antenna element AE1 outputs the first RF waveform towards the first portion 104A of the edge ring 104. Also, in the example, upon receiving the phase-shifted signal 124B, the antenna element AE2 outputs the second RF waveform towards the first portion 104A of the edge ring 104 and upon receiving the phase-shifted signal 124C, the antenna element AE3 outputs the third RF waveform towards the first portion 104A of the edge ring 104. In the example, upon receiving the phase-shifted signal 124D, the antenna element AE4 outputs the fourth RF waveform towards the first portion 104A of the edge ring 104 and upon receiving the phase-shifted signal 124E, the antenna element AE5 outputs the fifth RF waveform towards the first portion 104A of the edge ring 104. The first portion 104A of the edge ring 104 combines RF power of the first through fifth RF waveforms to output a main beam, such as the main beam MB1 (FIG. 1A-1) or MB2 (FIG. 1C), in the vertical direction towards a gap in the plasma chamber.

In an embodiment, in operation, the antenna elements AE1 through AE5 receive the phase-shifted signals 324A, 324B, 324C, 324D, and 324E (FIG. 3B). In response to receiving a respective one of the phase-shifted signals 324A through 324E, a respective one of the antenna elements AE1 through AE5 outputs the first through fifth RF waveforms via the first portion 104A of the edge ring 104. The first portion 104A of the edge ring 104 combines RF power of the first through fifth RF waveforms to output a main beam, such as the main beam MB1 (FIG. 1A-1) or MB2 (FIG. 1C), in the vertical direction towards a gap in the plasma chamber.

FIG. 9 is an isometric view of an embodiment of an antenna array 900, which is used for uniformity control, such as edge uniformity control. The antenna array 900 includes antenna elements 902, 904, 906, 908, and 910. The antenna element 902 is an example of the antenna element AE5, the antenna element 904 is an example of the antenna element AE4, the antenna element 906 is an example of the antenna element AE3, the antenna element 908 is an example of the antenna element AE2, and the antenna element 910 is an example of the antenna element AE1. To illustrate, each of the antenna elements 902, 904, 906, 908, and 910 is a ring that is annular in shape.

The antenna elements 902, 904, 906, 908, and 910 are concentric. To illustrate, the antenna elements 902, 904, 906, 908, and 910 have the same center. The antenna elements 902 through 910 have the same height, measured along the y-axis. For example, the antenna elements 902 through 910 are situated in the same horizontal plane and extend from a bottom surface of the horizontal plane to a top surface of the horizontal plane.

A distance between any two adjacent ones of the antenna elements 902 through 910 is d. For example, a distance between the antenna elements 902 and 904 is d and a distance between the antenna elements 904 and 906 is d. The distance d is measured along the x-axis or the z-axis. As an example, the distance d ranges from 2 millimeters (mm) to 10 mm. To illustrate, the distance d ranges from 5 mm to 8 mm. As another example, the distance d is equal to a half of a wavelength $\lambda$ of the RF signal 120 (FIG. 1A-1).

Also, there is a distance D between an inner surface 912 of the antenna element 910 and an outer surface 914 of the antenna element 902. For example, the distance D between the inner surface 912 the outer surface 914 ranges from 4 centimeter (cm) to 6 cm. To illustrate, the distance D is 5 cm. As another example, the distance D is a difference between a diameter of the outer surface 914 and a diameter of the inner surface 912. The inner surface 912 faces a direction towards a centroid 916 of each of the antenna elements 902 through 910 and the outer surface 914 faces a direction away from the centroid 916.

In one embodiment, the antenna elements 902, 904, 906, 908, and 910 are not concentric. For example, a centroid of one of the antenna elements 902 through 910 is not the same as a centroid of one of remaining ones of the antenna elements 902 through 910. To illustrate, a centroid of the antenna element 902 is different from a centroid of the antenna element 910.

In an embodiment, the antenna elements 902, 904, 906, 908, and 910 have different heights. For example, one of the antenna elements 902 through 910 is taller or shorter than one of remaining one of the antenna elements 902 through 910. To illustrate, the antenna element 902 is taller than the antenna element 910.

In one embodiment, a distance between any two adjacent ones of the antenna elements 902 through 910 is different from a distance between any two adjacent ones of remaining ones of the antenna elements 902 through 910. For example, a distance between the antenna elements 902 and 904 is greater than or less than the distance d between the antenna elements 904 and 906.

In one embodiment, an angle, such as $+\theta$ or $-\theta$, formed by a main beam, described herein, such as the main beam MB1 or MB2, is provided by $$\text{Angle} = \sin^{-1}(\Delta\phi.\lambda/(2\pi d)) \quad (5)$$

It should be noted that by controlling the angle of the main beam, the main beam can be directed to a specific zone in the plasma chamber. Plasma density increases in the direction of the main beam and electrons are heated in the direction to bend a plasma sheath to achieve a tilt in features of the substrate S.

FIG. 10 is a diagram of an embodiment of a system 1000 to illustrate a matrix 1002 of antenna elements. The matrix 1002 is coupled to the edge ring 104. For example, the matrix 1002 is embedded within the edge ring 104 (FIG. 1A-1) in the same manner the antenna elements AE1 through AE5 are embedded within the edge ring 104. To illustrate, the matrix 1002 extends from the side surface SS1 (FIG. 2) to the side surface SS2 of the edge ring 104.

The matrix 1002 includes multiple antenna elements AEa, AEb, AEc, AEd, AEe, AEf, AEg, AEh, AEi, AEj, AEk, AEl, AEm, AEn, AEo, and AEp. As an example, each antenna element AEa through AEp is a polygonal block, such as a rectangular block or a square block or a pixel. Each of the antenna elements AEa through AEp is fabricated from the same material from which any of the antenna elements AE1 through AE5 (FIG. 1A-1) is fabricated. Also, each of the antenna elements AEa through AEp has the same structure and function as any of the antenna elements AE1 through AE5.

The system 1000 includes the HFPS 102 and a phase shifter 1004. The phase shifter 1004 includes multiple phase shift circuits PSa, PSb, PSc, PSd, PSe, PSf, PSg, PSh, PSi, PSj, PSk, PSl, PSm, PSn, PSo, and PSp. Any of the phase shift circuits PSa through PSp has the same structure and function as any of the phase shift circuits PS1 through PS5 (FIG. 1A-2).

The HFPS 102 is coupled via a connection point CP4 to the phase shifter 1004. For example, the HFPS 102 is coupled via the connection 128 to the connection point CP4. In the example, the connection point CP4 is coupled via a respective connection to a respective one of the phase shift circuits PSa through PSp. For example, the connection point CP4 is coupled via a first connection to the phase shift circuit PSa and via a second connection to the phase shift circuit PSp.

Each of the phase shift circuits PSa through PSp is coupled via a respective connection to a respective one of the antenna elements AEa through AEp. For example, the phase shift circuit PSa is coupled to the antenna element AEa via a first connection and the phase shift circuit PSp is coupled to the antenna element AEp via a second connection.

The HFPS 102 generates the RF signal 120 and sends the RF signal 120 via the connection 128 to the connection point CP4. The RF signal 120 is split into p input signals, which is the same as a number of connections between the connection point CP4 and the phase shift circuits PSa through PSp, where p is a positive integer. For example, RF power of the RF signal 120 is split into p portions.

The controller 106 (FIG. 1A-1) is coupled via a separate connection to each of the phase shift circuits PSa through PSp. For example, the controller 106 is coupled via a first connection to the phase shift circuit PSa and is coupled via a second connection to the phase shift circuit PSp. The controller 106 provides amounts of phase shifts to the phase shift circuits PSa through PSp in the same manner in which the controller 106 provides the amounts of phase shifts to the phase shift circuits PS1 through PS5.

The phase shift circuits PSa through PSp receive the p input signals and shift phases of the p input signals to output p phase-shifted signals. For example, the phase shift circuit PSa shifts a phase of a first one of the p input signals to output a first phase-shift signal and the phase shift circuit PSp shifts a phase of a $p^{th}$ one of the p input signals to output a $p^{th}$ phase-shift signal. The phases of the p input signals are shifted as per the amounts of phase shifts received from the controller 106.

The antenna elements AEa through AEp receive the p phase-shifted signals and output p RF waveforms via the edge ring 104. For example, the antenna element AEa receives a first one of the p phase-shifted signals to output a first one of the p RF waveforms and the antenna element AEp receives a $p^{th}$ one of the p phase-shifted signals to output a $p^{th}$ one of the p RF waveforms. The edge ring 104 combines RF power of the first one of the $p^{th}$ RF waveforms through the $p^{th}$ one of the p RF waveforms to output a main beam, such as the main beam MB1 (FIG. 1A-1) or the main beam MB2 (FIG. 1C), in the vertical direction towards the plasma formed in the plasma chamber.

In one embodiment, an attenuator array is coupled between the connection point CP1 and the antenna array 1002. For example, p attenuators of the attenuator array are coupled between the connection point CP4 and the phase shifter 1004 or between the phase shifter 1004 and the antenna array 1002. The attenuator array is coupled to the controller 106 to control an amount of gain provided by each of the p attenuators.

In one embodiment, the matrix 1002 is coupled to, such as attached to or fixed to or embedded within, the substrate support 206 (FIG. 2) or to the left portion 602A (FIG. 6A) of the C-shroud 602 or to the right portion 602B of the C-shroud 602 or to the left body portion 652A of the pinnacle 652 or to the right body portion 652B of the pinnacle 652 (FIG. 6B). For example, the matrix 1002 is fixed to the substrate support 206 via screws or glue or soldering or a combination thereof.

In an embodiment, a first matrix, such as the matrix 1002, is coupled to the substrate support 206, or a second matrix, such as the matrix 1002, is coupled to the left portion 602A, or a third matrix, such as the matrix 1002, is coupled to the portion 602B, or a fourth matrix, such as the matrix 1002, is coupled to the left body portion 652A, or a fifth matrix, such as the matrix 1002, is coupled to the right body portion 652B, or a combination of two or more thereof, in addition to the matrix 1002 being coupled to the edge ring 104.

FIG. 11 is a diagram of an embodiment of a system 1100 to illustrate an antenna array 1102 that is segmented and control of the antenna array 1102. The antenna array 1102 is used for uniformity control, such as edge or azimuthal uniformity control. The antenna array 1102 includes multiple antenna elements, such as five antenna elements, and each antenna element is divided into multiple segments. For example, a first antenna element of the antenna array 1102 is divided into multiple antenna segments AES1*a*, AES2*a*, AES3*a*, AES4*a*, AES5*a*, AES6*a*, AES7*a*, and AES8*a*.

Any two of the adjacent antenna segments AES1*a* through AES8*a* of the first antenna element is separated by a dielectric segment. For example, the segment AES1*a* is separated from the segment AES2*a* by a dielectric segment DES1 and the segment AES2*a* is separated from the segment AES3*a* by a dielectric segment DES2. To illustrate, the antenna segments AES1*a* and AES2*a* are adjacent to each other when there is no antenna segment between the two antenna segments AES1*a* and AES2*a*. In a similar manner, any two adjacent antenna segments of a second antenna element, or a third antenna element, or a fourth antenna element, or a fifth antenna element of the antenna array 1102 is separated by the dielectric segment. For example, any two adjacent antenna segments of the second antenna element of the antenna array 1102 are separated by the dielectric segment DES1. As an example, a dielectric segment is fabricated from a dielectric, such as an insulator material.

The antenna array 1102 is coupled to the edge ring 104 (FIG. 1A-1) in the same manner in which the antenna array 110 (FIG. 1A-1) is coupled to the edge ring 104. For example, the antenna array 1102 is attached to the edge ring 104 via screws, or glue, or soldering, or a combination thereof.

The system 1100 further includes the controller 106, the HFPS 102, an attenuator array 1104, and a phase shifter 1106. The attenuator array 1104 includes multiple attenuators, such as AT1*a*, AT1*b*, and AT1*c*. For example, the attenuator array 1104 includes the same number of attenuators as that of the number of antenna segments of the antenna array 1102.

Also, the phase shifter 1106 includes multiple phase shift circuits, such as PS1*a*, PS1*b*, and PS1*c*. For example, the phase shifter 1106 includes the same number of phase shift circuits as that of the number of number of attenuators of the attenuator array 1104.

The controller 106 is coupled to the attenuator array 1104 and to the phase shifter 1106. For example, the controller 106 is coupled via a separate connection to each of the attenuators of the attenuator array 1104. To illustrate, the controller 106 is coupled via a first connection to the attenuator AT1*a*, via a second connection to the attenuator AT1*b*, and via a third connection to the attenuator AT1*c*. The controller 106 controls the attenuators of the attenuator array 1104 to apply amounts of gains in the same manner in which the controller 106 controls the attenuators AT1 through AT5 (FIG. 3A-2) to apply the gains G1 through G5. For example, the controller 106 provides a first control signal having a first resistance via a first connection to the attenuator AT1*a*, a second control signal having a second resistance via a second connection to the attenuator AT1*b*, and a third control signal having a third amount of gain via a third connection to the attenuator AT1*c*.

As another example, the controller 106 is coupled via a separate connection to each of the phase shift circuits of the phase shifter 1106. To illustrate, the controller 106 is coupled via a first connection to the phase shift circuit PS1*a*, via a second connection to the phase shift circuit PS2*a*, and via a third connection to the phase shift circuit PS3*a*. The controller 106 provides amounts of phase shifts to the phase shift circuits of the phase shifter 1106 in the same manner in which the controller 106 provides the amounts of phase shifts to the phase shift circuits PS1 through PS5 (FIG. 1A-2). For example, the controller 106 provides a first amount of phase shift via a first connection to the phase shift circuit PS1*a*, a second amount of phase shift via a second connection to the phase shift circuit PS1*b*, and a third amount of phase shift via a third connection to the phase shift circuit PS1*c*.

The HFPS 102 is coupled via the connection 128 to the connection point CP5. The connection point CP5 is coupled via a separate connection to a respective one of the attenuators of the attenuator array 1104. For example, the connection point CP5 is coupled via a first connection to the attenuator AT1*a*, via a second connection to the attenuator AT1*b*, and via a third connection to the attenuator AT1*c*.

Also, each attenuator of the attenuator array 1104 is coupled via a respective connection to a respective one of the phase shift circuits of the phase shifter 1106. For example, the attenuator AT1*a* is coupled via a first connection to the phase shift circuit PS1*a*, the attenuator AT1*b* is coupled via a second connection to the phase shift circuit PS1*b*, and the attenuator AT1*c* is coupled via a third connection to the phase shift circuit PS1*c*.

The phase shifter 1106 is coupled to the antenna array 1102. For example, each of the phase shift circuits of the phase shifter 1106 is coupled via a separate connection to a respective one of the antenna segments of the antenna array 1102. To illustrate, the phase shift circuit PS1*a* is coupled via a first connection to the antenna segment AES1*a*, the phase shift circuit PS2*a* is coupled via a second connection to the antenna segment AES2*a*, and the phase shift circuit PS3*a* is coupled via a third connection to the antenna segment AES3*a*.

In operation, the HFPS 102 generates the RF signal 120 and sends the RF signal 120 via the connection 128 to the connection point CP5. The RF signal 120 is split into q input signals, which is the same as a number of connections between the connection point CP5 and the attenuators of the attenuator array 1104, where q is a positive integer. For example, RF power of the RF signal 120 is split into q portions.

Based on the resistance values received from the controller 106, the attenuators of the attenuator array 1104 apply the resistance values to the q input signals to further apply gains to the q input signals to output q attenuated signals. For example, the attenuator ATS1*a* attenuates an amount of power of a first one of the q input signals to output a first attenuated signal, the attenuator ATS2*a* attenuates an amount of power of a second one of the q input signals to output a second attenuated signal, and the attenuator ATS3*a* attenuates an amount of power of a third one of the q input signals to output a third attenuated signal.

Also, based on the amounts of phase shifts received from the controller 106, the phase shift circuits of the phase shifter 1106 apply the amounts of phase shifts to the q attenuated signals to output q phase-shifted signals. For example, the phase shift circuit PS1*a* shifts a phase of a first one of the q attenuated signals to output a first phase shifted signal, the phase shift circuit PS1*b* shifts a phase of a second one of the q attenuated signals to output a second phase shifted signal, and the phase shift circuit PS1*c* shifts a phase of a third one of the q attenuated signals to output a third phase shifted signal.

The antenna segments of the antenna array 1102 receive the q phase shifted signals from the phase shifter 1106 and output q RF waveforms towards the edge ring 104. The edge ring 104 combines RF power of the q RF waveforms to output a main beam, such the main beam MB1 (FIG. 1A-1) or MB2 (FIG. 1C) or MB3 (FIG. 6A) or MB4 (FIG. 6B).

In one embodiment, any two adjacent antenna segments of the second or third or fourth or fifth antenna element of the antenna array 1102 are separated by a first dielectric segment. In the embodiment, any two adjacent antenna segments of the first antenna element of the antenna array 1102 are separated by a second dielectric segment.

In an embodiment, the antenna array 1102 is coupled to the C-shroud 602 (FIG. 6A) in the same manner in which the antenna array 110 (FIG. 1A-1) is coupled to the edge ring 104.

In one embodiment, the antenna array 1102 is coupled to the pinnacle 652 (FIG. 6B) in the same manner in which the antenna array 110 (FIG. 1A-1) is coupled to the edge ring 104.

In an embodiment, locations of the attenuator array 1104 and the phase shifter 1106 are switched. The HFPS 102 is coupled to the phase shifter 1106, which is coupled via the attenuator array 1104 to the antenna array 1102. For example, the phase shifter 1106 is coupled to the attenuator array 1104.

Embodiments, described herein, may be practiced with various computer system configurations including hand-held hardware units, microprocessor systems, microprocessor-based or programmable consumer electronics, minicomputers, mainframe computers and the like. The embodiments, described herein, can also be practiced in distributed computing environments where tasks are performed by remote processing hardware units that are linked through a computer network.

In some embodiments, a controller is part of a system, which may be part of the above-described examples. The system includes semiconductor processing equipment, including a processing tool or tools, chamber or chambers, a platform or platforms for processing, and/or specific processing components (a wafer pedestal, a gas flow system, etc.). The system is integrated with electronics for controlling its operation before, during, and after processing of a semiconductor wafer or substrate. The electronics is referred to as the "controller," which may control various components or subparts of the system. The controller, depending on processing requirements and/or a type of the system, is programmed to control any process disclosed herein, including a delivery of process gases, temperature settings (e.g., heating and/or cooling), pressure settings, vacuum settings, power settings, RF generator settings, RF matching circuit settings, frequency settings, flow rate settings, fluid delivery settings, positional and operation settings, wafer transfers into and out of a tool and other transfer tools and/or load locks connected to or interfaced with the system.

Broadly speaking, in a variety of embodiments, the controller is defined as electronics having various integrated circuits, logic, memory, and/or software that receive instructions, issue instructions, control operation, enable cleaning operations, enable endpoint measurements, and the like. The integrated circuits include chips in the form of firmware that store program instructions, digital signal processors (DSPs), chips defined as application specific integrated circuits (ASICs), programmable logic devices (PLDs), one or more microprocessors, or microcontrollers that execute program instructions (e.g., software). The program instructions are instructions communicated to the controller in the form of various individual settings (or program files), defining operational parameters for carrying out a process on or for a semiconductor wafer. The operational parameters are, in some embodiments, a part of a recipe defined by process engineers to accomplish one or more processing steps during the fabrication of one or more layers, materials, metals, oxides, silicon, silicon dioxide, surfaces, circuits, and/or dies of a wafer.

The controller, in some embodiments, is a part of or coupled to a computer that is integrated with, coupled to the system, otherwise networked to the system, or a combination thereof. For example, the controller is in a "cloud" or all or a part of a fab host computer system, which allows for remote access for wafer processing. The controller enables remote access to the system to monitor current progress of fabrication operations, examines a history of past fabrication operations, examines trends or performance metrics from a plurality of fabrication operations, to change parameters of current processing, to set processing steps to follow a current processing, or to start a new process.

In some embodiments, a remote computer (e.g. a server) provides process recipes to the system over a computer network, which includes a local network or the Internet. The remote computer includes a user interface that enables entry or programming of parameters and/or settings, which are then communicated to the system from the remote computer. In some examples, the controller receives instructions in the form of settings for processing a wafer. It should be understood that the settings are specific to a type of process to be performed on a wafer and a type of tool that the controller interfaces with or controls. Thus as described above, the controller is distributed, such as by including one or more discrete controllers that are networked together and working towards a common purpose, such as the fulfilling processes described herein. An example of a distributed controller for such purposes includes one or more integrated circuits on a chamber in communication with one or more integrated circuits located remotely (such as at a platform level or as part of a remote computer) that combine to control a process in a chamber.

Without limitation, in various embodiments, a plasma system, described herein, includes a plasma etch chamber, a deposition chamber, a spin-rinse chamber, a metal plating chamber, a clean chamber, a bevel edge etch chamber, a physical vapor deposition (PVD) chamber, a chemical vapor deposition (CVD) chamber, an atomic layer deposition (ALD) chamber, an atomic layer etch (ALE) chamber, an ion implantation chamber, a track chamber, or any other semiconductor processing chamber that is associated or used in fabrication and/or manufacturing of semiconductor wafers.

It is further noted that although the above-described operations are described with reference to a parallel plate plasma chamber, e.g., a capacitively coupled plasma chamber, etc., in some embodiments, the above-described operations apply to other types of plasma chambers, e.g., a plasma chamber including an inductively coupled plasma (ICP) reactor, a transformer coupled plasma (TCP) reactor, conductor tools, dielectric tools, a plasma chamber including an electron cyclotron resonance (ECR) reactor, etc. For example, an X MHz RF generator, a Y MHz RF generator, and a Z MHz RF generator are coupled to an inductor within the ICP plasma chamber.

As noted above, depending on a process operation to be performed by the tool, the controller communicates with one or more of other tool circuits or modules, other tool components, cluster tools, other tool interfaces, adjacent tools, neighboring tools, tools located throughout a factory, a main computer, another controller, or tools used in material transport that bring containers of wafers to and from tool locations and/or load ports in a semiconductor manufacturing factory.

With the above embodiments in mind, it should be understood that some of the embodiments employ various computer-implemented operations involving data stored in computer systems. These computer-implemented operations are those that manipulate physical quantities.

Some of the embodiments also relate to a hardware unit or an apparatus for performing these operations. The apparatus is specially constructed for a special purpose computer. When defined as a special purpose computer, the computer performs other processing, program execution or routines that are not part of the special purpose, while still being capable of operating for the special purpose.

In some embodiments, the operations, described herein, are performed by a computer selectively activated, or are configured by one or more computer programs stored in a computer memory, or are obtained over a computer network. When data is obtained over the computer network, the data may be processed by other computers on the computer network, e.g., a cloud of computing resources.

One or more embodiments, described herein, can also be fabricated as computer-readable code on a non-transitory computer-readable medium. The non-transitory computer-readable medium is any data storage hardware unit, e.g., a memory device, etc., that stores data, which is thereafter read by a computer system. Examples of the non-transitory computer-readable medium include hard drives, network attached storage (NAS), read-only memory (ROM), random access memory (RAM), compact disc-ROMs (CD-ROMs), CD-recordables (CD-Rs), CD-rewritables (CD-RWs), magnetic tapes and other optical and non-optical data storage hardware units. In some embodiments, the non-transitory computer-readable medium includes a computer-readable tangible medium distributed over a network-coupled computer system so that the computer-readable code is stored and executed in a distributed fashion.

Although some method operations, described above, were presented in a specific order, it should be understood that in various embodiments, other housekeeping operations are performed in between the method operations, or the method operations are adjusted so that they occur at slightly different times, or are distributed in a system which allows the occurrence of the method operations at various intervals, or are performed in a different order than that described above.

It should further be noted that in an embodiment, one or more features from any embodiment described above are combined with one or more features of any other embodiment without departing from a scope described in various embodiments described in the present disclosure.

Although the foregoing embodiments have been described in some detail for purposes of clarity of understanding, it will be apparent that certain changes and modifications can be practiced within the scope of appended claims. Accordingly, the present embodiments are to be considered as illustrative and not restrictive, and the embodiments are not to be limited to the details given herein, but may be modified within the scope and equivalents of the appended claims.

The invention claimed is:

1. A system for directing a main beam towards a gap within a plasma chamber, comprising:
- a first power source configured to generate a first radio frequency (RF) signal;
- a plurality of phase shift circuits coupled to the first power source via a connection point, wherein the plurality of phase shift circuits include a first phase shift circuit and a second phase shift circuit, wherein the connection point is configured to split the first RF signal into a plurality of input signals, wherein the plurality of input signals include a first input signal and a second input signal, wherein the first phase shift circuit is configured to receive the first input signal to output the first input signal, wherein the second phase shift circuit is configured to receive the second input signal and modify a phase of the second input signal to output a phase-shifted signal; and
- a plurality of antenna elements coupled to the plurality of phase shift circuits, wherein the plurality of antenna elements include a first antenna element and a second antenna element, wherein the first antenna element is configured to receive the first input signal from the first phase shift circuit and the second antenna element is configured to receive the phase-shifted signal from the second phase shift circuit to form the main beam that is directed at an angle towards the gap within the plasma chamber.

2. The system of claim 1, wherein the plurality of antenna elements are coupled to a bottom surface of an edge ring of the plasma chamber.

3. The system of claim 1, wherein the plurality of antenna elements are coupled to an outer surface of a pinnacle of the plasma chamber.

4. The system of claim 1, wherein the plurality of antenna elements are coupled to an outer surface of a C-shroud of the plasma chamber.

5. The system of claim 1, wherein the first power source is a gigahertz power source.

6. The system of claim 1, further comprising:
- a controller coupled to the first power source and the plurality of phase shift circuits, wherein the controller is configured to provide a power level and a frequency level of the first RF signal to the first power source, wherein the controller is configured to control the second phase shift circuit to shift the phase of the second input signal with respect to a phase of the first input signal.

7. The system of claim 1, further comprising:
- an edge ring, wherein the plurality of antenna elements are coupled to the edge ring;
- a substrate support located adjacent to the edge ring;
- a second power source coupled to the substrate support via a match, wherein the second power source is configured to generate a second RF signal and send the second RF signal to the match, wherein the match is configured to modify an impedance of the second RF signal to output a modified signal and provide the modified signal to the substrate support.

8. The system of claim 1, wherein the first antenna element is a first annular ring and the second antenna element is a second annular ring.

9. The system of claim 1, wherein the first antenna element and the second antenna element are parts of a matrix.

10. A system for directing a main beam towards a gap within a plasma chamber, comprising:
- a first power source configured to generate a first radio frequency (RF) signal;
- a plurality of attenuation elements coupled to the first power source via a connection point, wherein the plurality of attenuation elements include a first attenuation element and a second attenuation element, wherein the connection point is configured to split the first RF signal into a plurality of input signals, wherein the plurality of input signals include a first input signal and a second input signal, wherein the first attenuation element is configured to receive the first input signal to output a first attenuated signal and the second attenuation element is configured to receive the second input signal to output a second attenuated signal;
- a plurality of phase shift circuits coupled to the plurality of attenuation elements, wherein the plurality of phase shift circuits include a first phase shift circuit and a second phase shift circuit, wherein the first phase shift circuit is configured to receive the first attenuated signal to output the first attenuated signal, wherein the second phase shift circuit is configured to receive the second attenuated signal and modify a phase of the second attenuated signal to output a phase-shifted signal;

a plurality of antenna elements coupled to the plurality of phase shift circuits, wherein the plurality of antenna elements include a first antenna element and a second antenna element, wherein the first antenna element is configured to receive the first attenuated signal from the first phase shift circuit and the second antenna element is configured to receive the phase-shifted signal from the second phase shift circuit to form the main beam that is directed at an angle towards the gap within the plasma chamber.

11. The system of claim 10, wherein the plurality of antenna elements are coupled to a bottom surface of an edge ring of the plasma chamber.

12. The system of claim 10, wherein the plurality of antenna elements are coupled to an outer surface of a pinnacle of the plasma chamber.

13. The system of claim 10, wherein the plurality of antenna elements are coupled to an outer surface of a C-shroud of the plasma chamber.

14. The system of claim 10, wherein the first power source is a gigahertz power source.

15. The system of claim 10, further comprising:

a controller coupled to the first power source, the plurality of phase shift circuits, and the plurality of attenuation elements, wherein the controller is configured to provide a power level and a frequency level of the first RF signal to the first power source, wherein the controller is configured to control the first attenuation element to change an amount of attenuation applied to the first input signal, wherein the controller is configured to control the second attenuation element to change an amount of attenuation applied to the second input signal, wherein the controller is configured to control the second phase shift circuit to shift the phase of the second attenuated signal with respect to a phase of the first attenuated signal.

16. The system of claim 10, further comprising:

an edge ring, wherein the plurality of antenna elements are coupled to the edge ring;

a substrate support located adjacent to the edge ring;

a second power source coupled to the substrate support, wherein the second power source is configured to generate a second RF signal and send the second RF signal.

17. The system of claim 10, wherein the first antenna element is a first annular ring and the second antenna element is a second annular ring.

18. The system of claim 10, wherein the first antenna element and the second antenna element are parts of a matrix.

19. A system for directing a main beam towards a gap within a plasma chamber, comprising:

an edge ring; and a plurality of antenna elements coupled to the edge ring, wherein the plurality of antenna elements include a first antenna element and a second antenna element, wherein the first antenna element is configured to receive a radio frequency (RF) signal having a phase and the second antenna element is configured to receive a phase-shifted signal, wherein the phase-shifted signal has a phase that is shifted with respect to the phase of the RF signal to output the main beam towards the gap within the plasma chamber.

20. The system of claim 19, wherein the edge ring has a bottom surface, wherein the plurality of antenna elements is coupled to the bottom surface of the edge ring.

* * * * *